United States Patent
Kawa

(10) Patent No.: US 9,329,024 B2
(45) Date of Patent: May 3, 2016

(54) DIMENSION MEASURING APPARATUS, DIMENSION MEASURING METHOD, AND PROGRAM FOR DIMENSION MEASURING APPARATUS

(75) Inventor: Yasutaka Kawa, Osaka (JP)

(73) Assignee: Keyence Corporation, Osaka (JP)

( * ) Notice: Subject to any disclaimer, the term of this patent is extended or adjusted under 35 U.S.C. 154(b) by 1062 days.

(21) Appl. No.: 13/346,916

(22) Filed: Jan. 10, 2012

(65) Prior Publication Data

US 2012/0194673 A1    Aug. 2, 2012

(30) Foreign Application Priority Data

Feb. 1, 2011  (JP) .................... 2011-019768

(51) Int. Cl.
*H04N 7/18* (2006.01)
*G01B 11/02* (2006.01)
*G01B 9/04* (2006.01)

(52) U.S. Cl.
CPC ............ *G01B 11/028* (2013.01); *G01B 9/04* (2013.01)

(58) Field of Classification Search
None
See application file for complete search history.

(56) References Cited

U.S. PATENT DOCUMENTS

| | | | | |
|---|---|---|---|---|
| 7,590,276 | B2 * | 9/2009 | Delaney | 382/141 |
| 2006/0165275 | A1 * | 7/2006 | Horita | G01B 11/2522 382/152 |
| 2008/0234984 | A1 * | 9/2008 | Ortyn et al. | 702/190 |
| 2010/0111367 | A1 | 5/2010 | Hiraoka | |
| 2010/0189308 | A1 * | 7/2010 | Nakatsukasa | 382/106 |

FOREIGN PATENT DOCUMENTS

| | | |
|---|---|---|
| CN | 101226052 A | 7/2008 |
| JP | 2009-300124 | 12/2009 |
| JP | 2009-300125 | 12/2009 |
| JP | 2010-019667 | 1/2010 |
| JP | 2010-032329 | 2/2010 |
| JP | 2010-032330 | 2/2010 |
| JP | 2010-032331 | 2/2010 |
| JP | 2010-032471 | 2/2010 |
| JP | 2010032471 A * | 2/2010 |
| JP | 2010-060528 | 3/2010 |
| JP | 2010-169584 | 8/2010 |

OTHER PUBLICATIONS

Office Action received in corresponding Chinese Patent Application No. 201210022431.9 dated Aug. 24, 2015 with English translation (26 pages).

* cited by examiner

*Primary Examiner* — James M Anderson, II
(74) *Attorney, Agent, or Firm* — Kilyk & Bowersox, P.L.L.C.

(57) ABSTRACT

A dimension measuring apparatus is configured of: an imaging section that photographs a workpiece on the movable stage; a depth extending section that performs depth extension on a plurality of the workpiece images in different Z-directional positions in the movable stage, to generate a depth extended image; a master image displaying section that screen-displays as a master image the depth extended image obtained by photographing a master workpiece; a measured position information generating section that designates a position to be measured and a measuring method with respect to the master image, to generate measured position information; an edge extracting section that extracts an edge of the position to be measured from the depth extended image, obtained by photographing the workpiece, based on the measured position information; and a dimension value calculating section that obtains a dimension value of the position to be measured based on the extracted edge.

7 Claims, 16 Drawing Sheets

AT THE TIME OF SETTING MEASURED PLACE

AT THE TIME OF MEASURING DIMENSION OF WORKPIECE

DIMENSION MEASURING APPARATUS, DIMENSION MEASURING METHOD, AND PROGRAM FOR DIMENSION MEASURING APPARATUS

CROSS-REFERENCE TO RELATED APPLICATIONS

The present application claims foreign priority based on Japanese Patent Application No. 2011-019768, filed Feb. 1, 2011, the contents of which is incorporated herein by reference.

BACKGROUND OF THE INVENTION

1. Field of the Invention

The present invention relates to a dimension measuring apparatus, a dimension measuring method, and a program for dimension measuring apparatus. More specifically, the present invention relates to improvement in dimension measuring apparatus which measures a dimension of a workpiece on a movable stage being movable in a Z direction based on an edge of a workpiece image obtained by photographing the workpiece.

2. Description of Related Art

In general, a dimension measuring apparatus is an apparatus for measuring a dimension of a workpiece based on an edge of a workpiece image obtained by photographing a workpiece, and may be called an image measuring apparatus (e.g., Unexamined Japanese Patent Publication No. 2009-300124, Unexamined Japanese Patent Publication No. 2009-300125, Unexamined Japanese Patent Publication No. 2010-19667). Normally, a workpiece is placed in a movable stage that is movable in X-axis, Y-axis and Z-axis directions. The movable stage is moved in the Z-axis direction to perform focus adjustment of the workpiece image, and moved in the X-axis and Y-axis directions to perform positioning of the workpiece within a field of view.

The workpiece image has an extremely accurate similar shape to that of the workpiece regardless of the position of the movable stage in the Z-axis direction, and hence determining a distance and an angle on the image can detect an actual dimension on the workpiece image. In the case of measuring the dimension of the workpiece by means of such a dimension measuring apparatus, increasing a photographing magnification can lead to improvement in measurement accuracy. However, a depth of field decreases with increase in photographing magnification, and hence in the case of a workpiece having a step exceeding the depth of field, only part of the workpiece is in focus. There has thus been a problem in that an entire image of the workpiece is difficult to grasp and measurement setting is not easy. Especially when a plurality of positions with different Z-directional heights in the workpiece are set as objects to be measured, in order to designate each of these positions as the object to be measured, it has been necessary to manually adjust a Z-directional position of the movable stage so as to perform focus adjustment. There has thus been a problem in that an operating procedure for measurement setting is complicated and it takes a long time to perform measurement setting.

SUMMARY OF THE INVENTION

The present invention was made in view of the above circumstances, and an object of the present invention is to provide a dimension measuring apparatus capable of measuring a dimension of a workpiece with high accuracy, while setting with ease a position as an object to be measured even when a workpiece is one having a step exceeding a depth of field.

Especially, an object is to provide a dimension measuring apparatus capable of improving measurement accuracy, while setting with ease a plurality of positions having different Z-directional heights as objects to be measured. Further, an object is to provide a dimension measuring apparatus capable of simplifying an operating procedure for measurement setting, while reducing the time required for measurement setting and dimension measurement for the workpiece.

Moreover, an object of the present invention is to provide a dimension measuring method capable of measuring a dimension of a workpiece with high accuracy while simplifying an operating procedure for measurement setting, and also capable of reducing the time required for measurement setting and dimension measurement for the workpiece.

Furthermore, an object of the present invention is to provide a program for a dimension measuring apparatus, which makes a terminal device function as a dimension measuring apparatus as described above.

A dimension measuring apparatus according to a first present invention is a dimension measuring apparatus which measures a dimension of a workpiece on a movable stage being movable in a Z direction based on an edge of a workpiece image obtained by photographing the workpiece. The dimension measuring apparatus is configured including: imaging section that photographs a workpiece on the movable stage, to generate a workpiece image; a depth extending section that performs depth extension on two or more of the workpiece images in different Z-directional positions in the movable stage, to generate a depth extended image; a master image displaying section that screen-displays as a master image the depth extended image obtained by photographing a master workpiece; a measured position information generating section that designates a position to be measured and a measuring method with respect to the master image, to generate measured position information; an edge extracting section that extracts an edge of the position to be measured from the depth extended image, obtained by photographing the workpiece, based on the measured position information; and a dimension value calculating section that obtains a dimension value of the position to be measured based on the extracted edge.

With such a configuration, since the depth extended image obtained by photographing the master workpiece is used as the master image for designating a position to be measured and a measuring method, it is possible to grasp a whole image of the workpiece with ease so long as the workpiece has the same shape as the master workpiece even when the workpiece has a step exceeding the depth of field of the imaging section. This can facilitate setting of a plurality of positions with different Z-directional heights in the work as the object to be measured. Further, since an edge is extracted from the depth extended image obtained by photographing the workpiece with respect to the position to be measured as thus set to calculate a dimension value, it is possible to obtain a desired dimension without manual adjustment of a Z-directional position of the movable stage at the time of dimension measurement for the workpiece. That is, the user can perform setting of the position to be measured and actual dimension measurement without awareness of the step of the work. Hence it is possible to improve measurement accuracy while simplifying an operating procedure for dimension measurement, and also reduce the time required for dimension measurement.

A dimension measuring apparatus according to a second present invention is a dimension measuring apparatus which measures a dimension of a workpiece on a movable stage being movable in a Z direction based on an edge of a workpiece image obtained by photographing the workpiece. The dimension measuring apparatus is configured including: an imaging section that photographs a master workpiece on the movable stage, to generate a photographed image; a depth extending section that performs depth extension on two or more of the photographed images in different Z-directional positions in the movable stage, to generate a depth extended image; a master image displaying section that screen-displays the depth extended image as a master image; a measured position information generating section that designates a position to be measured and a measuring method with respect to the master image, to generate measured position information; a focus-on-measured-position adjusting section that moves the movable stage to a Z-directional position corresponding to the position to be measured, for focus adjustment to the position to be measured; an edge extracting section that extracts an edge of the position to be measured from the workpiece image, subjected to focus adjustment, based on the measured position information; and a dimension value calculating section that obtains a dimension value of the position to be measured based on the extracted edge.

With such a configuration, since the depth extended image obtained by photographing the master workpiece is used as the master image for designating a position to be measured and a measuring method, it is possible to grasp a whole image of the workpiece with ease so long as the workpiece has the same shape as the master workpiece even when the workpiece has a step exceeding the depth of field of the imaging section. This can facilitate setting of a plurality of positions with different Z-directional heights in the work as the object to be measured. Further, the movable stage is moved to a Z-directional position corresponding to the position to be measured as thus set, for focus adjustment so as to obtain the workpiece image. Since an edge is extracted from this workpiece image to calculate a dimension value of the position to be measured, it is possible to obtain a desired dimension even without manual adjustment of the Z-directional position of the movable stage at the time of dimension measurement for the workpiece. That is, the user can perform setting of the position to be measured and actual dimension measurement without awareness of the step of the work. Hence it is possible to improve measurement accuracy while simplifying an operating procedure for dimension measurement, and also reduce the time required for dimension measurement.

In addition to the above configuration, a dimension measuring apparatus according to a third present invention is configured such that, in the case of the presence of two or more positions to be measured with different heights with respect to the same workpiece, the movable stage is sequentially moved to Z-directional positions corresponding to these positions to be measured.

With such a configuration, since the movable stage is sequentially moved for focus adjustment, even in the case of the presence of a plurality of positions to be measured with different heights with respect to the same workpiece, it is possible to automatically transfer these positions to be measured sequentially to focal positions, so as to obtain the dimension values of the positions to be measured.

In addition to the above configuration, a dimension measuring apparatus according to a fourth present invention is configured including: an epi-illumination light source that applies illumination light from the same side as the imaging section to the workpiece on the movable stage; and a photographed image displaying section that moves the movable stage to a Z-directional position corresponding to the position to be measured at the time of designation of the position to be measured with respect to the master image, for focus adjustment so as to obtain and screen-display a photographed image of the master workpiece after the focus adjustment, the apparatus being configured such that the measured position information generating section designates a position to be measured and a measuring method with respect to the photographed image of the master workpiece after the focus adjustment, to generate the measured position information.

With such a configuration, when a position to be measured is designated for the master image, the movable stage is moved to a corresponding Z-directional position, for focus adjustment so that a photographed image of the master workpiece is obtained. Since a position to be measured and a measuring method are designated with respect to this photographed image, conditions for edge extraction or the like can be set in detail by means of an actual image without awareness of a height of the position to be measured.

In addition to the above configuration, a dimension measuring apparatus according to a fifth present invention is configured including: a feature amount information generating section that generates feature amount information formed of a checkup pattern image based on the photographed image of the master workpiece; and a workpiece detecting section that specifies a location and posture of the workpiece on the movable stage based on the feature amount information, the apparatus being configured such that the edge extracting section performs edge extraction on the position to be measured based on the specified location and posture and the measured position information.

With such a configuration, the workpiece image obtained by photographing the workpiece on the movable stage is checked with the pattern image, to allow accurate specification of the location and posture of the workpiece having the same shape as the master workpiece. Further, since edge extraction is performed on the position to be measured based on the specified location and posture, even when the workpiece is arranged in an arbitrary posture and an arbitrary position on the movable stage, a desired dimension can be measured with high accuracy so long as the workpiece is arranged within the photographed field of view.

In addition to the above configuration, a dimension measuring apparatus according to a sixth present invention is configured such that the feature amount information generating section generates the feature amount information based on the depth extended image obtained by photographing the master workpiece, and the workpiece detecting section checks the depth extended image, obtained by photographing the workpiece, with the pattern image to specify the location and posture of the workpiece.

With such a configuration, since a checkup pattern image obtained from a depth extended image with a deeper field than that of the imaging section is checked with the depth extended image of the workpiece, to specify a location and posture, it is possible to improve the accuracy in positioning of the workpiece.

A dimension measuring method according to a seventh present invention is a dimension measuring method for measuring a dimension of a workpiece on a movable stage being movable in a Z direction based on an edge of a workpiece image obtained by photographing the workpiece. The dimension measuring method is configured including: an imaging step for photographing a workpiece on the movable stage, to generate a workpiece image; a depth extending step for performing depth extension on two or more of the workpiece images in different Z-directional positions in the movable stage, to generate a depth extended image; a master image displaying step for screen-displaying as a master image the depth extended image obtained by photographing a master workpiece; a measured position information generating step for designating a position to be measured and a measuring method with respect to the master image, to generate measured position information; an edge extracting step for extracting an edge of the position to be measured from the depth extended image, obtained by photographing a workpiece, based on the measured position information; and a dimension value calculating step for obtaining a dimension value of the position to be measured based on the extracted edge.

A dimension measuring method according to an eighth present invention is a dimension measuring method for measuring a dimension of a workpiece on a movable stage being movable in a Z direction based on an edge of a workpiece image obtained by photographing the workpiece. The dimension measuring method is configured including: an imaging step for photographing a master workpiece on the movable stage, to generate a photographed image; a depth extending step for performing depth extension on two or more of the photographed images in different Z-directional positions in the movable stage, to generate a depth extended image; a master image displaying step for screen-displaying the depth extended image as a master image; a measured position information generating step for designating a position to be measured and a measuring method with respect to the master image, to generate measured position information; a focus-on-measured-position adjusting step for moving the movable stage to a Z-directional position corresponding to the position to be measured, for focus adjustment to the position to be measured; an edge extracting step for extracting an edge of the position to be measured from the workpiece image, subjected to focus adjustment, based on the measured position information; and a dimension value calculating step for obtaining a dimension value of the position to be measured based on the extracted edge.

A dimension measuring method according to a ninth present invention is a dimension measuring program for a dimension measuring apparatus for measuring a dimension of a workpiece on a movable stage being movable in a Z direction based on an edge of a workpiece image obtained by photographing the workpiece. The program is configured including: an imaging procedure for photographing a workpiece on the movable stage, to generate a workpiece image; a depth extending procedure for performing depth extension on two or more of the workpiece images in different Z-directional positions in the movable stage, to generate a depth extended image; a master image displaying procedure for screen-displaying as a master image the depth extended image obtained by photographing a master workpiece; a measured position information generating procedure for designating a position to be measured and a measuring method with respect to the master image, to generate measured position information; an edge extracting procedure for extracting an edge of the position to be measured from the depth extended image, obtained by photographing a workpiece, based on the measured position information; and a dimension value calculating procedure for obtaining a dimension value of the position to be measured based on the extracted edge.

A dimension measuring method according to a tenth present invention is a dimension measuring program for a dimension measuring apparatus for measuring a dimension of a workpiece on a movable stage being movable in a Z direction based on an edge of a workpiece image obtained by photographing the workpiece. The program is configured including: an imaging procedure for photographing a master workpiece on the movable stage, to generate a photographed image; a depth extending procedure for performing depth extension on two or more of the photographed images in different Z-directional positions in the movable stage, to generate a depth extended image; a master image displaying procedure for screen-displaying the depth extended image as a master image; a measured position information generating procedure for designating a position to be measured and a measuring method with respect to the master image, to generate measured position information; a focus-on-measured-position adjusting procedure for moving the movable stage to a Z-directional position corresponding to the position to be measured, for focus adjustment to the position to be measured; an edge extracting procedure for extracting an edge of the position to be measured from the workpiece image, subjected to focus adjustment, based on the measured position information; and a dimension value calculating procedure for obtaining a dimension value of the position to be measured based on the extracted edge.

In the dimension measuring apparatus according to the present invention, it is possible to measure a dimension of a workpiece with high accuracy, while setting with ease a position as an object to be measured even when a workpiece is one having a step exceeding a depth of field.

Moreover in the dimension measuring method according to the present invention, it is possible to measure a dimension of a workpiece with high accuracy while simplifying an operating procedure for measurement setting, and also reduce the time required for measurement setting and dimension measurement for the workpiece.

Furthermore, in the program for a dimension measuring apparatus according to the present invention, it is possible to make a terminal device function as a dimension measuring apparatus as described above.

DETAILED DESCRIPTION OF PREFERRED EMBODIMENTS

Embodiment 1

Dimension Measuring Apparatus 1

Figure 1:
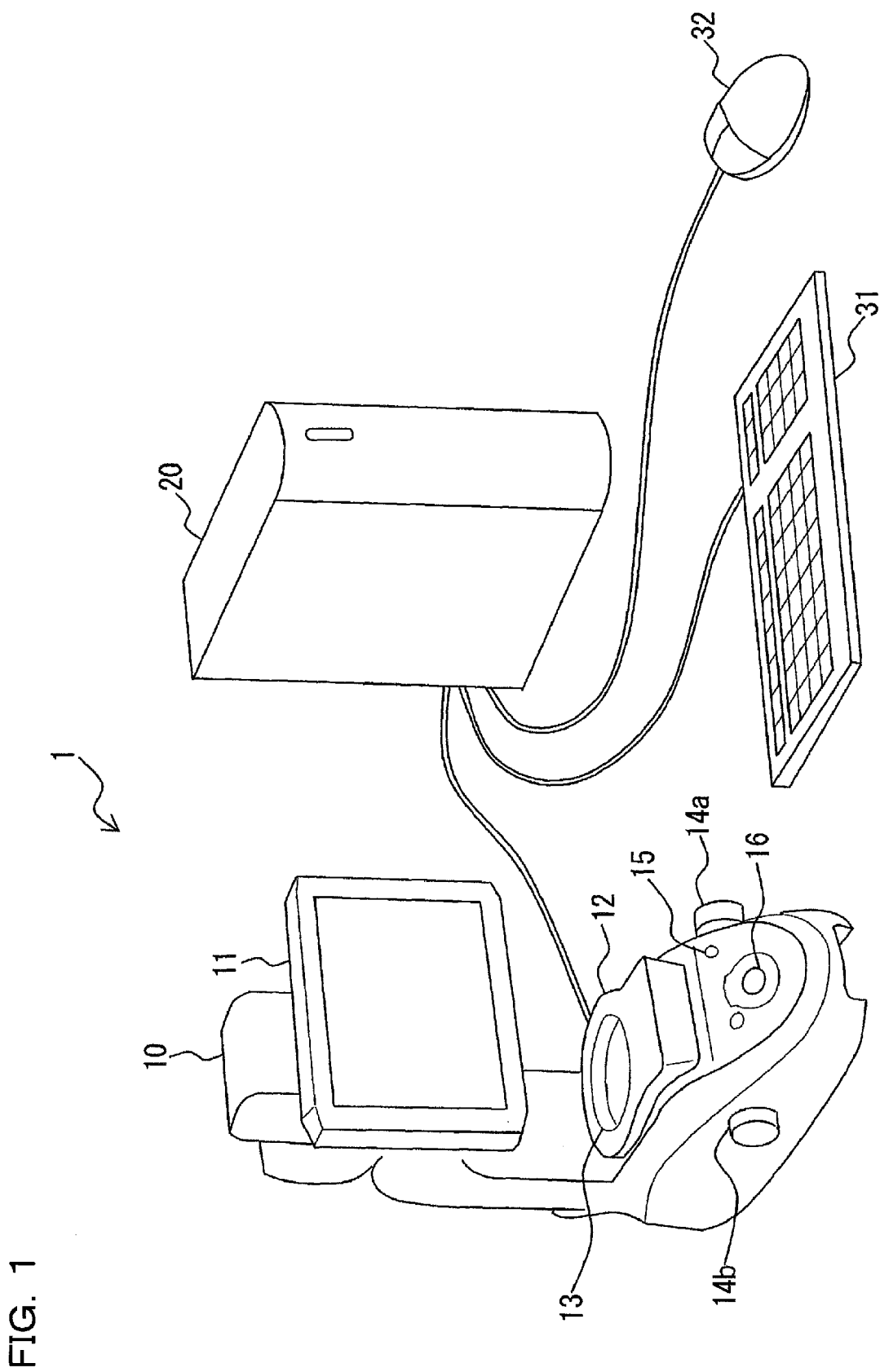
FIG. 1 is a perspective view showing a constitutional example of a dimension measuring apparatus 1 according to Embodiment 1 of the present invention.

FIG. 1 is a perspective view showing a constitutional example of a dimension measuring apparatus 1 according to Embodiment 1 of the present invention. This dimension measuring apparatus 1 is an image measuring apparatus that photographs a workpiece arranged on a movable stage 12 and analyzes the photographed image, to measure a dimension of the workpiece. The dimension measuring apparatus 1 is configured by a measurement unit 10, a control unit 20, a keyboard 31 and a mouse 32. The workpiece is an object to be measured whose shape and dimensions are to be measured.

The measurement unit 10 is an optical-system unit that applies illumination light to the workpiece and receives transmitted light transmitted through the workpiece or reflected light reflected by the workpiece, to generate a photographed image. The measurement unit 10 is provided with a display 11, a movable stage 12, an XY-position adjustment knob 14a, a Z-position adjustment knob 14b, a power switch 15 and a measurement start button 16.

The display 11 is a display that screen-displays the photographed image, a measurement result and measurement condition setting screen. The movable stage 12 is a mounting stage for mounting a workpiece as an object to be measured, and is formed with a detection area 13, through which illumination light is transmitted, within a roughly horizontal and flat mounting surface thereof. The detection area 13 is a circular area made of transparent glass. This movable stage 12 can be moved in a Z-axis direction which is parallel to a photographing axis and in each of an X-axis direction and a Y-axis direction which are vertical to the photographing axis.

The XY-position adjustment knob 14a is an operating section for moving the movable stage 12 in the X-axis direction and the Y-axis direction. The Z-position adjustment knob 14b is an operating section for moving the movable stage 12 in the Z-axis direction. The power switch 15 is an operating section for turning on or off a power supply of the measurement unit 10 and the control unit 20, and the measurement start button 16 is an operating section for stating dimension measurement.

The control unit 20 is a controller that controls the display 11 and the movable stage 12 of the measurement unit 10, and analyzes a workpiece image photographed by the measurement unit 10, to calculate the dimension of the workpiece. The keyboard 31 and the mouse 32 are connected to the control unit 20. After turning on the power supply, appropriately arranging a workpiece within the detection area 13 and operating the measurement start button 16 lead to automatic measurement of the workpiece.

<Measurement Unit 10>

Figure 2:
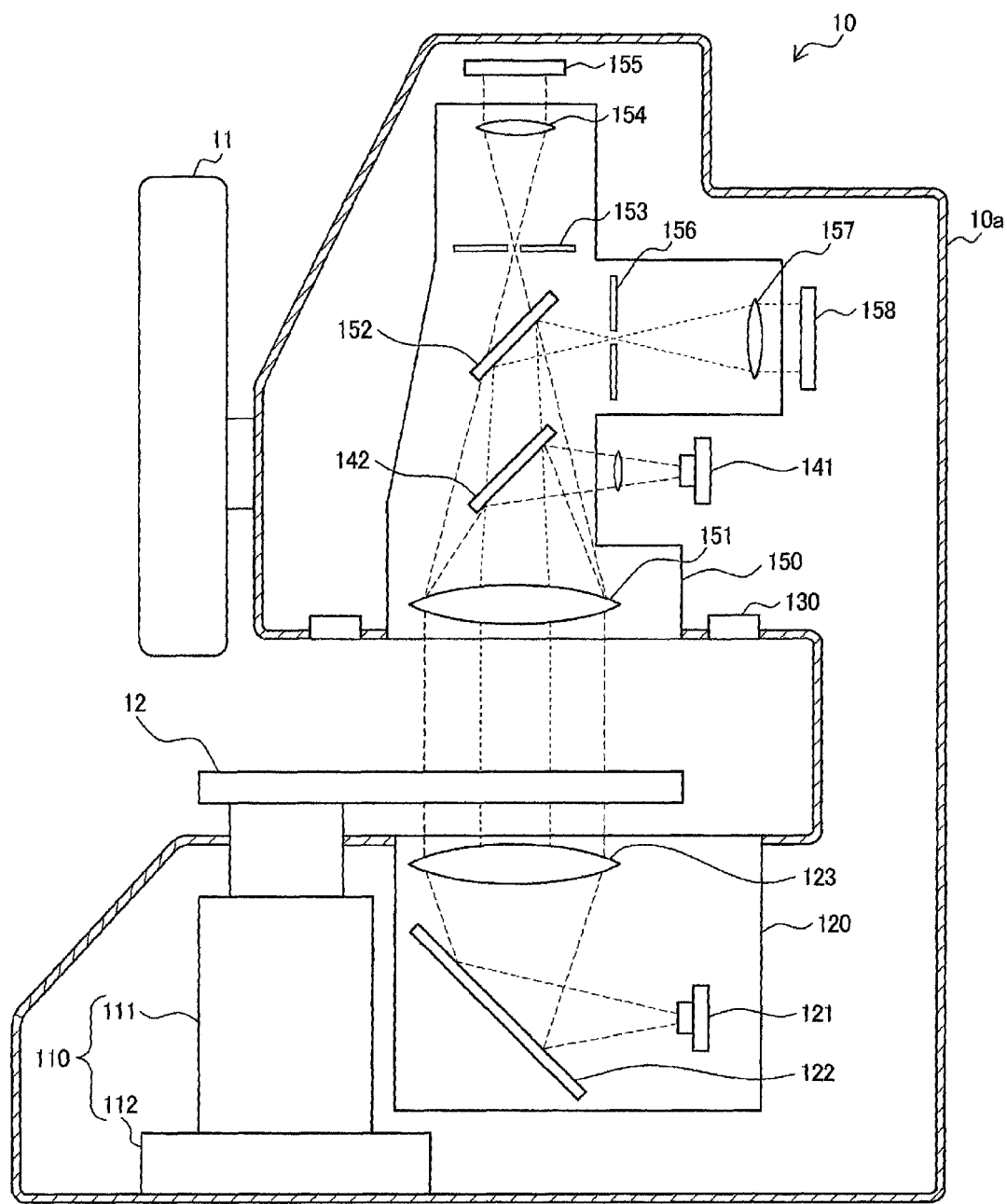
FIG. 2 is an explanatory view of a constitutional example of the inside of the measurement unit 10 of FIG. 1, showing a cut surface in the case of cutting the measurement unit 10 along its vertical plane.

FIG. 2 is an explanatory view of a constitutional example of the inside of the measurement unit 10 of FIG. 1, showing a cut surface in the case of cutting the measurement unit 10 along its vertical plane. This measurement unit 10 includes the display 11, the movable stage 12, a stage driving unit 110, a transmitted illumination unit 120, a ring illumination unit 130, a coaxial epi-illumination light source 141, a light-receiving lens unit 150, and imaging elements 155 and 158.

The display 11 and the movable stage 12 are arranged outside a housing 10a. The stage driving unit 110, the transmitted illumination unit 120, the ring illumination unit 130, the coaxial epi-illumination light source 141, the light-receiving lens unit 150 and the imaging elements 155 and 158 are accommodated inside the housing 10a. Further, the stage driving unit 110 and the transmitted illumination unit 120 are arranged below the movable stage 12. The ring illumination unit 130, the coaxial epi-illumination light source 141, the light-receiving lens unit 150 and the imaging elements 155 and 158 are arranged above the movable stage 12.

This measurement unit 10 applies illumination light to the workpiece arranged within the detection area 13 of the movable stage 12, and receives the transmitted light or reflected light, to allow the imaging elements 155 and 158 to form an image so as to acquire a workpiece image. This workpiece image is analyzed to measure the dimension of the workpiece, thereby allowing display of a measurement result on the display 11. The workpiece on the movable stage 12 can be photographed with different photographing magnifications. For example, it is possible to select between a low-magnification photographing, in which a photographed area with a diameter of the order of 25 mm is regarded as a photographed field of view, and a high-magnification photographing, in which a photographed area with a diameter of the order of 6 mm is regarded as a photographed field of view. A low-magnification image obtained by photographing the workpiece with a low magnification and a high-magnification image obtained by photographing the workpiece with a high magnification can be electrically switched and displayed on the display 11.

The stage driving unit 110 is a driving unit that moves the movable stage 12 based on a control signal from the control unit 20, and is made up of a Z-driving section 111 and an XY driving section 112. The Z driving section 111 is a Z-position adjusting section that moves the movable stage 12 in the Z-axis direction within a predetermined range, for adjusting a position of the workpiece in the photographing axis direction. The XY driving section 112 is an XY position adjusting section that moves the movable stage 12 in the X-axis direction and the Y-axis direction within a predetermined range, for adjusting the position of the workpiece in the photographing axis direction.

The transmitted illumination unit 120 is an illumination device for applying illumination light from below to the workpiece arranged within the detection area 13 of the movable stage 12, and is made up of a transmitted illumination light source 121, a mirror 122 and an optical lens 123. Transmitted illumination light launched from the transmitted illumination light source 121 is reflected by the mirror 122 and launched via the optical lens 123. This transmitted illumination light is transmitted through the movable stage 12, and a part of the transmitted light is cut off by the workpiece, while the other part thereof is incident on the light-receiving lens unit 150. The transmitted illumination is suitable for measurement of an outer shape of a workpiece and an inner diameter of a through hole.

The ring illumination unit 130 is an epi-illumination device for applying illumination light to the workpiece to the movable stage 12 from above, and is made up of a ring-like light source surrounding a light-receiving section of the light-receiving lens unit 150. This ring illumination unit 130 is an illumination device capable of performing separate lighting, and the entire perimeter of the unit, or only a part thereof, can be lighted.

The coaxial epi-illumination light source 141 is a light source for applying illumination light, having substantially the same launched light axis as the photographing axis, to the workpiece on the movable stage 12 from above. Inside the light-receiving lens unit 150, there is arranged a half mirror 142 for branching off the illumination light into a launched light axis and the photographing axis. The epi-illumination is suitable for measurement of dimensions of a workpiece having different levels. Especially, coaxial epi-illumination using the coaxial epi-illumination light source 141 is preferably used to measure a workpiece having a number of regular reflection components existing in the reflected light, since illumination light is hardly reflected diffusely on a workpiece surface, such as a metal surface subjected to a mirror finishing.

As a workpiece illuminating method, transmitted illumination, ring illumination or coaxial epi-illumination can be selected. Especially, a position wished to be measured and an illuminating method with respect to each workpiece can be automatically switched to perform dimension measurement.

The light-receiving lens unit 150 is an optical system made up of a light-receiving lens 151, the half mirror 152, diaphragm plates 153 and 156, and image forming lenses 154 and 157. The light-receiving lens unit 150 receives transmitted illumination light and light reflected by the workpiece, to allow the imaging elements 155 and 158 to form an image. The light-receiving lens 151 is an objective lens which is arranged as opposed to the movable stage 12, and is shared in use for high-magnification photographing and low-magnification photographing. This light-receiving lens 151 has a property of holding a size of an image unchanged even when a position of a workpiece in the Z-axis direction changes. The light-receiving lens 151 is called a telecentric lens.

The diaphragm plate 153 and the image forming lens 154 are a low-magnification-side image forming lens section, and arranged on the same axis as the light-receiving lens 151. The image forming lens 154 is an optical lens arranged as opposed to the imaging element 155.

On the other hand, the diaphragm plate 156 and the image forming lens 157 are a high-magnification-side image forming lens section, and a high-magnification photographing axis is branched off from the low-magnification photographing axis by the half mirror 152. The image forming lens 157 is an optical lens arranged as opposed to the imaging element 158.

The imaging element 155 is an image sensor for low magnification which photographs with a low magnification a workpiece within a low-magnification field of view formed by the light-receiving lens unit 150, to generate a low-magnification image. The imaging element 158 is an image sensor for high magnification which photographs with a high magnification a workpiece within a high-magnification field of view formed by the light-receiving lens unit 150, to generate a high-magnification image. The high-magnification field of view is a narrower photographed field of view than the low-magnification field of view, and is formed within the low-magnification field of view.

The imaging elements 155 and 158 are each made up of a semiconductor element such as CCD (Charge Coupled Devices) or CMOS (Complementary Metal Oxide Semiconductor).

In this dimension measuring apparatus 1, wherever and in whatever posture the workpiece is arranged, the workpiece is captured so long as being arranged within the detection area 13 of the movable stage 12, and the low-magnification image is then analyzed to move the movable stage 12 in the X-axis direction or the Y-axis direction, thereby to automatically transfer the workpiece into the high-magnification field of view.

Figure 3:
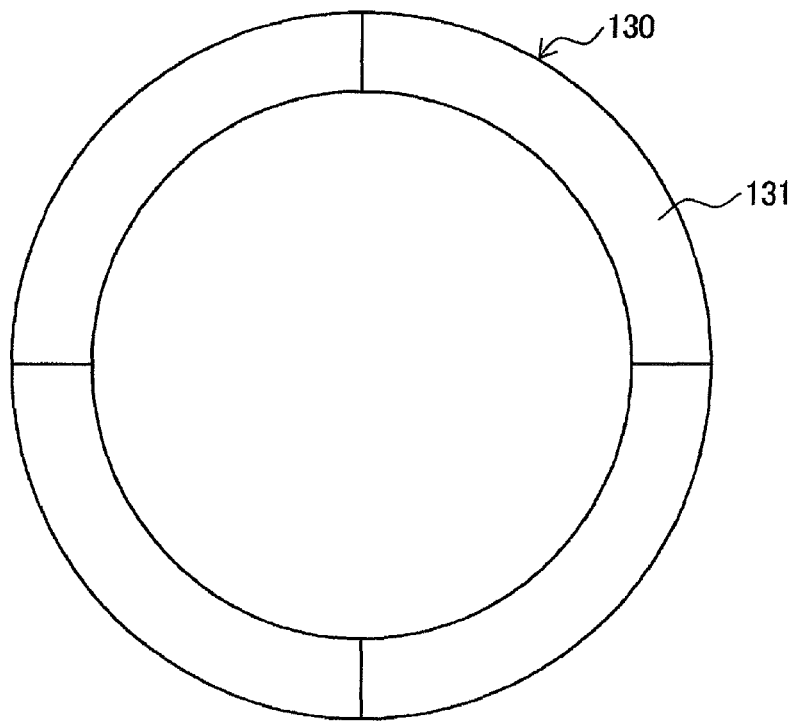
FIG. 3 is a view showing a constitutional view of a ring illumination unit 130 of FIG. 2.

FIG. 3 is a view showing a constitutional view of the ring illumination unit 130 of FIG. 2. This ring illumination unit 130 is made up of four light-emitting blocks 131 arranged on a circumference, and can be lighted by arbitrarily selecting the light-emitting blocks 131.

It can be designated in the measured position information as to which light-emitting block 131 is to be lighted at the time of dimension measurement. Especially in the case of measuring a plurality of positions to be measured for the same workpiece W, the light-emitting block 131 to be lighted with respect to each of these positions to be measured can be designated.

<Operation of Dimension Measuring Apparatus 1>

Figure 4:
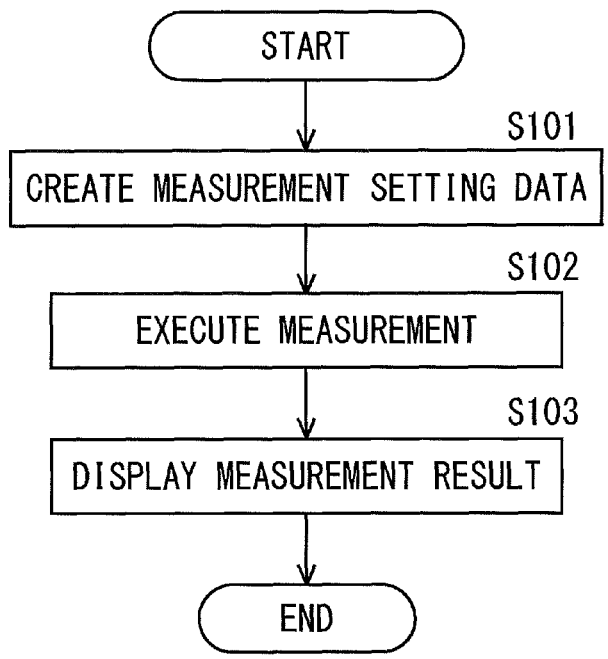
FIG. 4 is a flowchart showing an example of operations in the dimension measuring apparatus 1 of FIG. 1.

Steps S101 to S103 of FIG. 4 are a flowchart showing an example of operations of the dimension measuring apparatus 1 of FIG. 1. In this dimension measuring apparatus 1, the operation is made up of three processes, namely, creation of measurement setting data (Step S101), execution of measurement (Step S102), and display of a measurement result (Step S103).

The measurement setting data is information required for execution of measurement, and is made up of feature amount information showing a feature amount, measured position information showing a position to be measured and a type of measurement, and design value information showing a design value and a tolerance with respect to each position to be measured. The feature amount information is information for positioning which is used for analyzing a workpiece image to detect a position and a posture of the workpiece. The feature amount information is set based on predetermined master data. It is to be noted that, when the feature amount information and the measured position information are ones having been set based on a high-magnification image, discrimination information indicative of such setting is held as measurement setting data.

The measurement setting data is created in the control unit 20. Alternatively, there may be a configuration where measurement setting data created in an information processing terminal such as a PC (personal computer) is transferred to the control unit 20 and then used. Measurement processing is executed based on such measurement setting data. Then, dimension values obtained by measurement and a result of quality determination are displayed on the display 11, to perform display processing for the measurement result.

<Creation of Measurement Setting Data>

Figure 5:
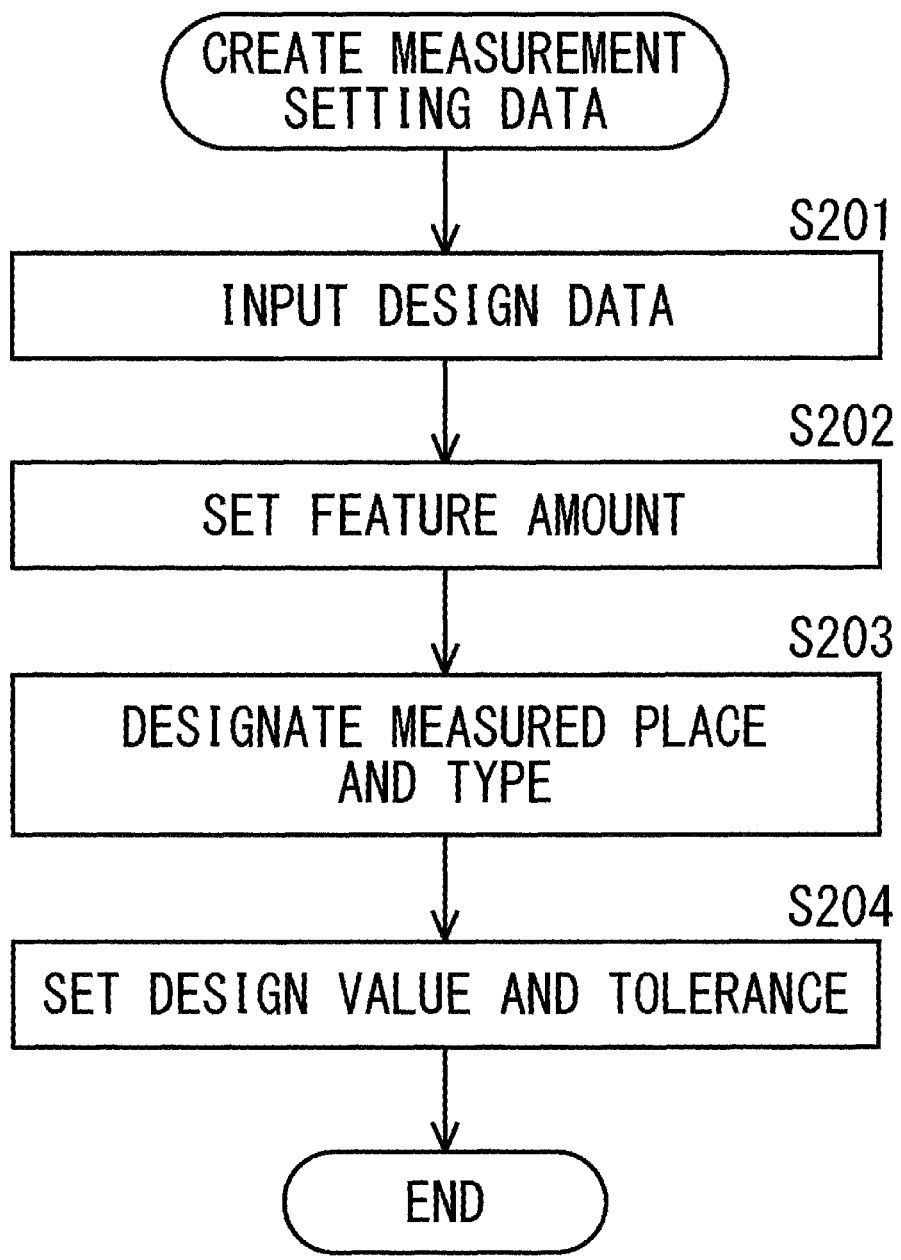
FIG. 5 is a flowchart showing an example of the operations in the dimension measuring apparatus 1 of FIG. 1 at the time of creating measurement setting data.

Steps S201 to S204 of FIG. 5 are a flowchart showing an example of the operations in the dimension measuring apparatus 1 of FIG. 1 at the time of creating measurement setting data. This figure shows the case of creating measurement setting data in the control unit 20.

The measurement setting data creating processing is made up of five processing procedures shown below. First, design data is inputted (Step S201). In inputting the design data, master data for use in feature amount setting and shape comparison is acquired. The master data is formed of a photographed image obtained by photographing a master workpiece, or CAD (Computer Aided Design) data or a CAD image created by means of CAD. An example of the case of using a master image, obtained by photographing a master workpiece, as master data will be described here.

Next, a feature amount is set (Step S202). Feature amount information and a measurement range are set based on the master image, thereby to set the feature amount. Next, a position to be measured and a type of measurement are designated (Step S203). Specifically, the designation of those is performed by designating a position to be measured, an edge detection area and a measuring method with respect to the master image displayed on the display 11.

The edge detection area is an image processing area for analyzing a change in brightness in image data therewithin, to extract an edge. In designating the type of measurement, a measuring method of what is measured in which manner is selected. Upon completion of designation of the position to be measured and the type of measurement, dimension measurement is executed on the master image. That is, an edge of the position to be measured is extracted with respect to the master image, to calculate a dimension value of the position to be measured by a designated measuring method. A measurement result of the dimension value is, for example, displayed on the master image.

Next, a design value and a tolerance are set (Step S204). In setting the design value and the tolerance, the displayed dimension value with respect to each position to be measured is changed according to the need, and set as a design value. Further, a tolerance is set in association with the design value. The measurement setting data created in this manner is written into a memory inside the control unit 20.

<Photographed Image of Workpiece W with Steps>

Figure 6:
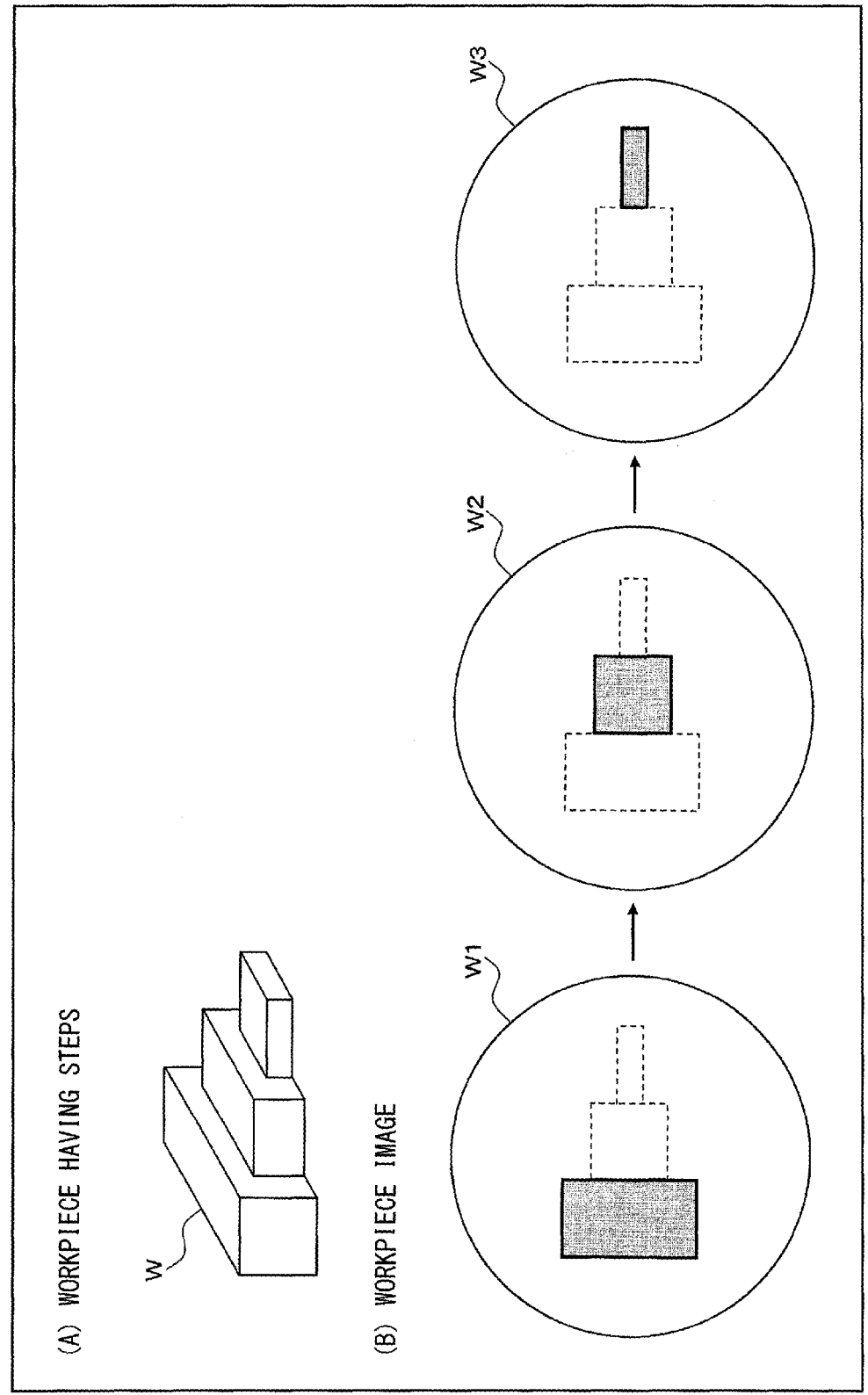
FIGS. 6A and 6B are views showing an example of each of workpiece images W1 to W3 obtained by photographing a workpiece W having steps by use of the dimension measuring apparatus 1 of FIG. 1.

FIGS. 6A and 6B are views showing an example of each of workpiece images W1 to W3 obtained by photographing a workpiece W having steps by use of the dimension measuring apparatus 1 of FIG. 1. These figures show the case of photographing by mans of epi-illumination. FIG. 6A shows a perspective view of the workpiece W having steps, and FIG. 6B shows the workpiece images W1 to W3 obtained by photographing while moving the movable stage 12 in the Z direction.

This workpiece W is made up of a top block being highest, a mid block being moderately high, and a bottom block being lowest in the Z direction, and formed with a step between the top surface of the top block and the top surface of the mid block, and a step between the top surface of the mid block and the top surface of the bottom block. The workpiece images W1 to W3 are photographed images obtained by photographing the workpiece image W arranged on the movable stage 12, and are for example made up of low-magnification images obtained by photographing the workpiece image W within the low-magnification field of view.

When the foregoing steps of the workpiece W are larger than the depth of field at the time of low-magnification photographing, a whole image of the workpiece W cannot be captured in the workpiece images W1 to W3 since only a position within the range of the depth of field comes into focus. That is, the workpiece image W1 is photographed at the lowest Z-directional position of the movable stage 12 out of the three workpiece images W1 to W3, and only the top surface of the top block is in focus. The workpiece image W2 is photographed at the moderately high Z-directional position of the movable stage 12, and only the top surface of the mid block is in focus. The workpiece image W3 is photographed at the highest Z-directional position of the movable stage 12, and only the top surface of the bottom block is in focus.

In the case of setting a plurality of positions with different Z-directional heights with respect to such a workpiece W, in order to designate each of these positions as the object to be measured, a conventional dimension measuring apparatus has been required to manually adjust the Z-directional position of the movable stage 12, for focus adjustment.

As opposed to this, dimension measuring apparatus 1 according to the present embodiment uses a depth extended image, obtained by performing depth extension on a plurality of photographed images obtained by photographing the same master workpiece, as the master image for designating a position to be measured and a measuring method, and can thereby grasp a whole image of the workpiece W with ease so long as the workpiece W has the same shape as the master workpiece even when the workpiece W has steps exceeding the depth of field. For this reason, a plurality of positions with different Z-directional heights can be set with ease as objects to be measured without manual adjustment of the Z-directional positions of the movable stage 12.

<Master Image M1 and Measurement Setting Screen 2>

FIGS. 7A and 7B are views showing an example of the operations in the dimension measuring apparatus 1 of FIG. 1 at the time of setting a position to be measured. FIG. 7A shows a master image M1 obtained by performing depth extension on a plurality of photographed images obtained by photographing the master workpiece, and FIG. 7B shows a measurement setting screen 2 for setting a position to be measured by use of the master image M1.

The master image M1 is a depth extended image obtained by performing depth extension on a plurality of photographed images obtained by photographing the same master workpiece while making Z-directional positions of the movable stage 12 located differently at regular intervals, and performing depth extension on the obtained plurality of photographed images. The master workpiece is a reference object having the same shape as the workpiece W as the object to be measured.

The depth extended image is a multifocal image obtained by synthesizing a plurality of photographed images having different positions in focus, to temporarily increase the depth of field. Such a depth extended image is created as one image such that, for example, a brightness change in each photographed image is analyzed to obtain edge strength with respect to each pixel, and pixel values of photographed images in focus are connected with one another based on the obtained edge strength.

Each photographed image for use in depth extension is associated with position information showing the Z-directional position of the movable stage 12, and each pixel of the depth extended image is associated with the position information of the corresponding photographed image. Accordingly, designating a pixel in the master image M1 allows identification of the Z-directional position of the movable stage 12 at the time of photographing the corresponding photographed image. That is, measured position information that has been set using the master image M1 is associated with Z-directional position information of the movable stage 12. Although a photographed image acquired for depth extension may be either a low-magnification image or a high-magnification image, the low-magnification image is assumed to be used here.

In this master image M1, the respective top surfaces of the top block, the mid block and the bottom block are in focus, and an entire image of the workpiece W can be identified with ease. A range in which the movable stage 12 is moved in the Z direction for depth extension can be arbitrarily designated. For example, an upper limit and a lower limit of the movement range can be changed as appropriate. Further, an interval (pitch) at the time of moving the movable stage 12 and the number of photographed images for use in depth extension can be arbitrarily designated, and can be changed as appropriate.

The measurement setting screen 2 is an input screen for setting a position to be measured and a measuring method, and is displayed on the display 11. In this measurement setting screen 2, a display area 21 for displaying the master image M1 and a variety of setting buttons 22 and 23 are arranged. The setting button 22 is an operating icon for setting a type of measurement, an illumination method and the like. The setting button 23 is an operating icon for setting conditions for edge extraction at the time of extracting an edge of the position to be measured.

The measured position information and the type of measurement are designated with respect to the master image M1 inside the display area 21, thereby to create measured position information. For example, an edge detection area A1 is set by designating a boundary surrounding part of an edge of the master workpiece. When a position to be measured and a type of measurement thereof are designated, dimension measurement is executed on the master image M1, and a dimension value of the position to be measured is displayed on the master image M1. The user can designate a design value and a tolerance with reference to the measurement result.

<Switching Between Depth Extended Image and Actual Image>

Figure 8:
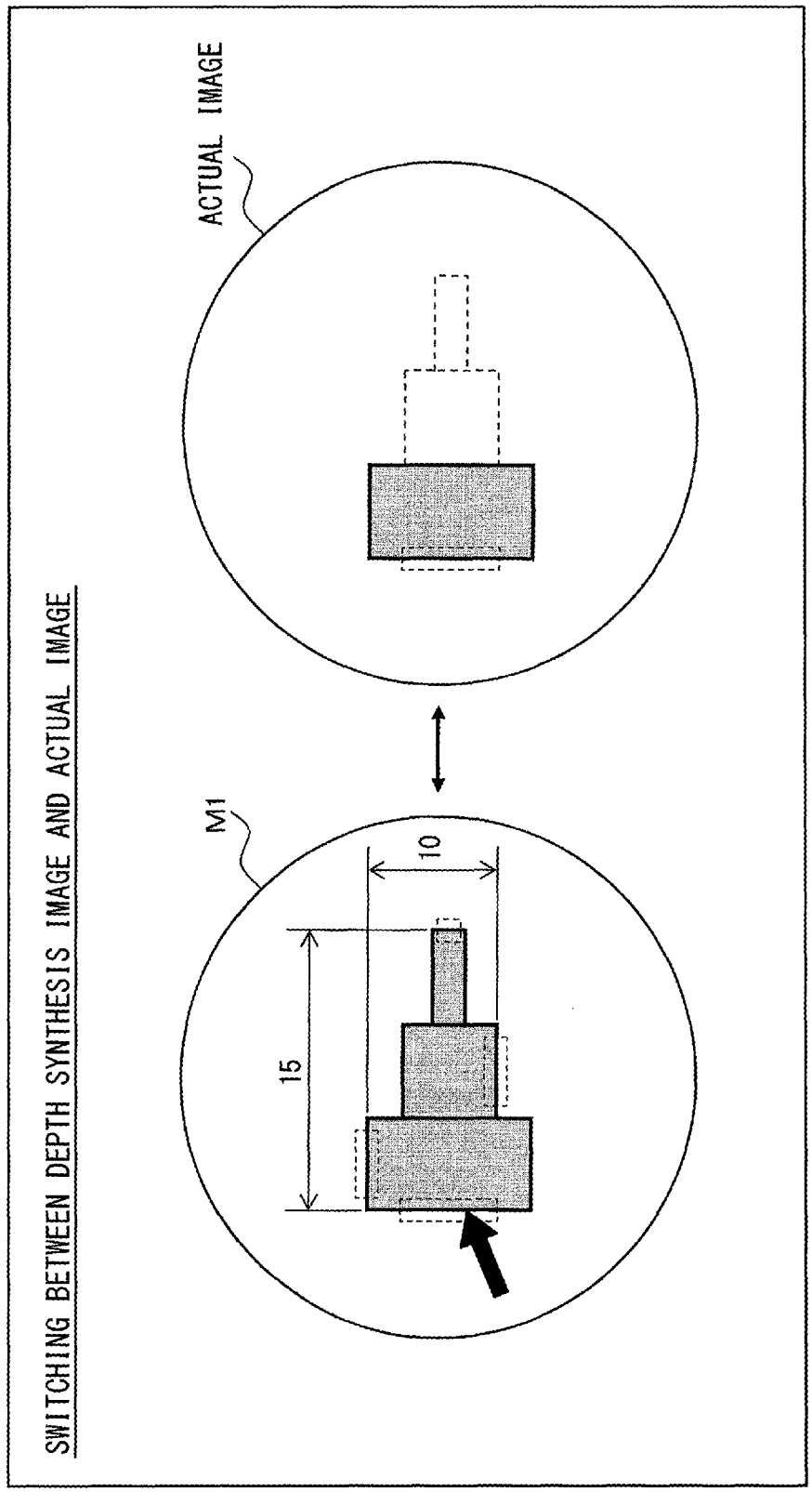
FIG. 8 is a view showing an example of the operations in the dimension measuring apparatus 1 of FIG. 1 at the time of setting a measured position, showing the state of switching between the master image M1 and an actual image.

FIG. 8 is a view showing an example of the operations in the dimension measuring apparatus 1 of FIG. 1 at the time of setting a measured position, showing the state of switching between the master image M1 and an actual image obtained by photographing the master workpiece. In the case of performing measurement setting on the measurement setting screen 2, the master image M1 obtained by performing depth extension and the actual image obtained by photographing the master workpiece on the movable stage 12 can be switched to each other in terms of the position to be measured by a designated predetermined switching operation.

For example in the master image M1 displayed inside the display area 21, part of an edge is designated by a mouse pointer or the like, and a switching command is inputted by a click operation performed by the mouse 32, so that the image inside the display area 21 can be switched to the actual image. This actual image is a photographed image obtained by photographing the master workpiece on the movable stage 12, and at the time of switching to the actual image, the movable stage 12 is automatically moved to the Z-directional position corresponding to the position designated by the mouse pointer or the like. It is therefore possible to confirm the designated position in the state of being in focus by means of the actual image.

The image is switched to the actual image as appropriate, to allow setting of conditions for edge extraction with respect to a specific position on the master workpiece at the time of extracting an edge from the depth extended image or the photographed image, such as a scanning direction or an edge direction, and also allow performance of actual dimension measurement on the set edge extracting condition, to confirm the operation.

<Setting of Measured Position>

Figure 9:
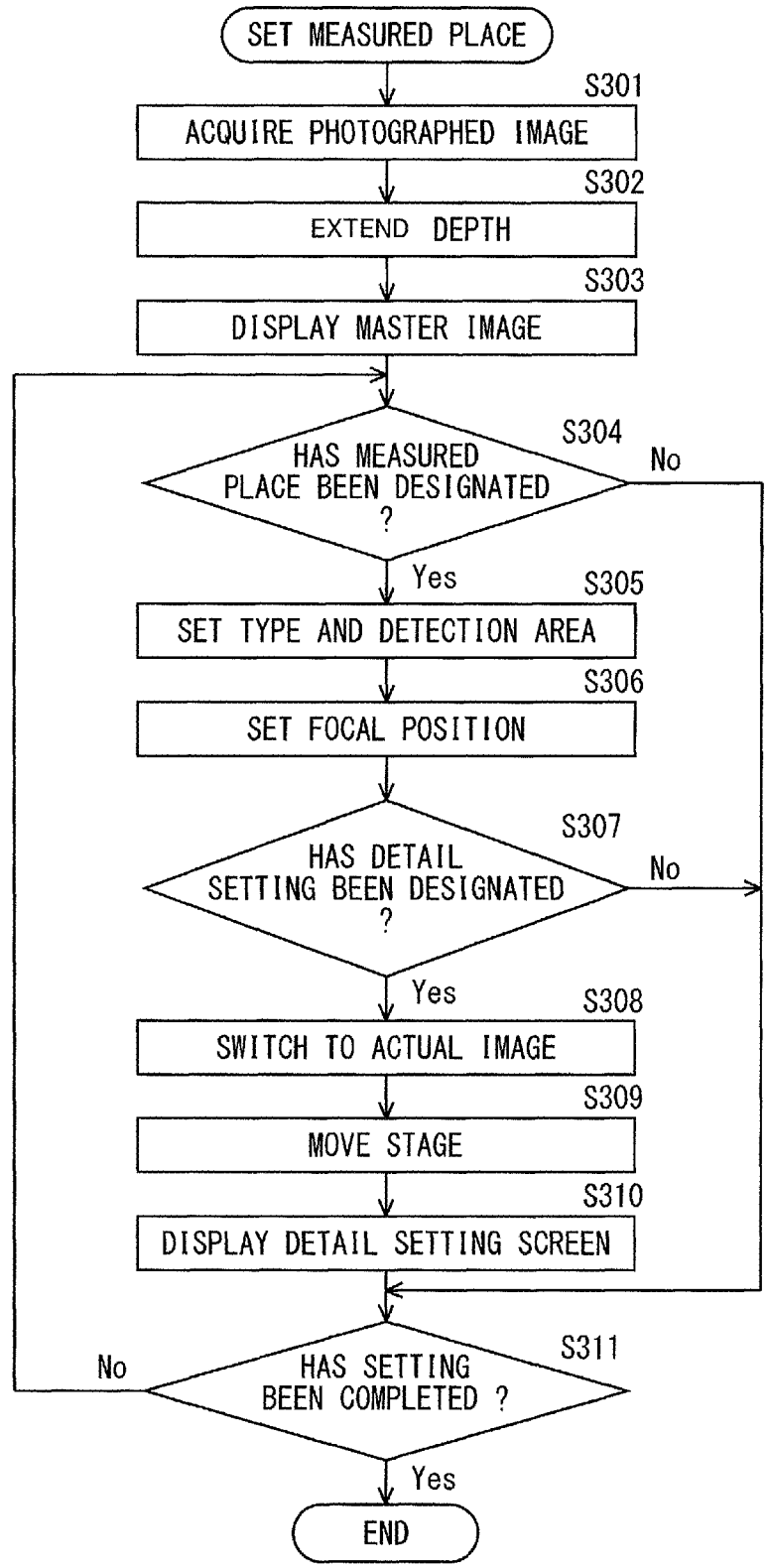
FIG. 9 is a flowchart showing an example of the operations in the dimension measuring apparatus 1 of FIG. 1 at the time of setting a measured position.

Steps S301 to S311 of FIG. 9 are a flowchart showing an example of the operations in the dimension measuring apparatus 1 of FIG. 1 at the time of setting a measured position. When a predetermined master workpiece is arranged on the movable stage 12 and the setting start for the position to be measured is designated by a predetermined operation, first, the movable stage 12 is moved to a start position for depth extension, and the master workpiece on the movable stage 12 is photographed, to acquire a photographed image (Step S301).

Then, the movable stage 12 is moved in the Z direction only by a fixed distance, to re-acquire a photographed image. This re-acquirement of the photographed image is repeated until the movable stage 12 reaches an end position, and when Z-directional scanning is completed by the movable stage 12 reaching the end position, the obtained plurality of photographed images are subjected to depth extension (Step S302), and the master image M1 obtained by depth extension is displayed on the measurement setting screen 2 (Step S303).

Next, when a position to be measured is designated with respect to the master image M1 by a predetermined operation, a type of measurement and an edge detection area A1 are set (Steps S304 and S305). Next, a focal position is set (Step S306). In setting of the focal position, a height (Z-directional position) of the movable stage 12 for focus adjustment is designated with respect to the position to be measured whose type of measurement and edge detection area A1 were set in Step S305, and its position information is held in association with the position to be measured. The focal position information is associated with each position to be measured. Next, when detail setting is designated by the operation of the setting button 23, an image inside the display area 21 is switched to the actual image (Steps S307 and S308).

The movable stage 12 is then moved to the Z-directional position corresponding to the position designated on the master image M1, to display a predetermined detail setting screen (Steps S309 and S310). The processing procedure from Steps S304 to S310 is repeated until completion of setting of the measured position (Step S311).

<Specification of Location and Posture of Workpiece W>

Figure 10A:
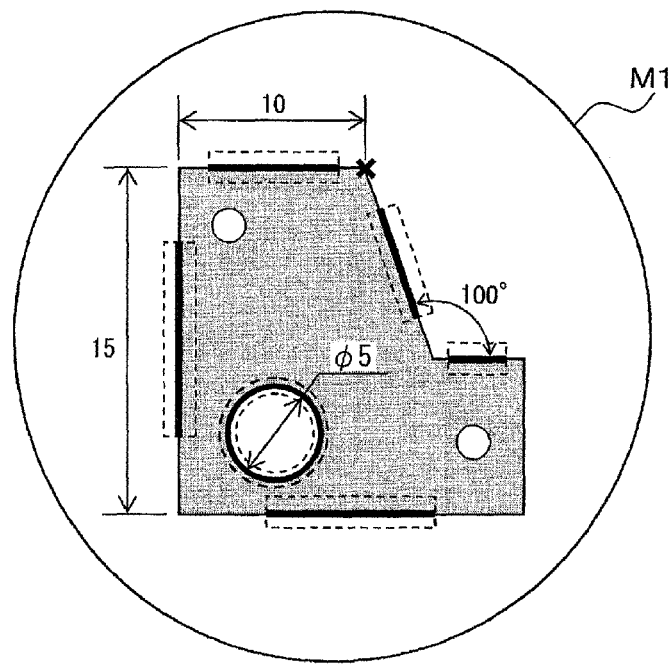
FIGS. 10A and 10B are views showing an example of the operations in the dimension measuring apparatus 1 of FIG. 1, showing a master image M1 at the time of measurement setting and a workpiece image W10 at the time of workpiece measurement.
Figure 10B:
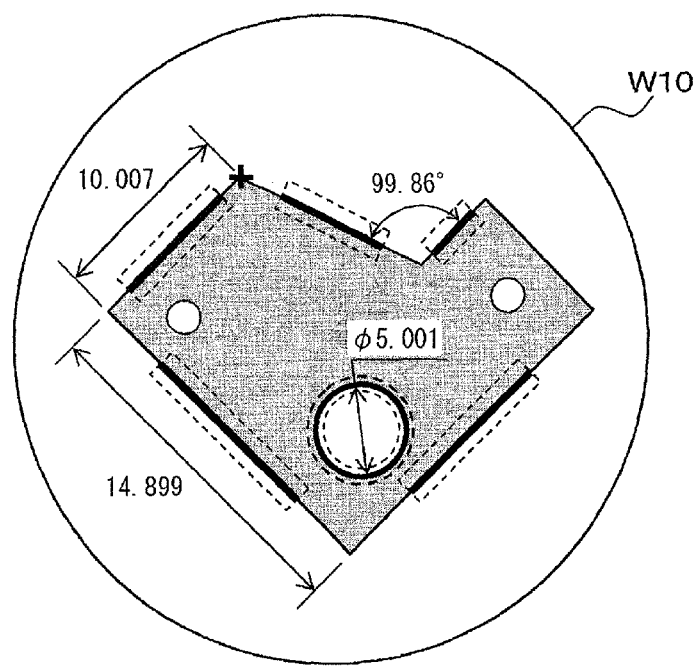

FIGS. 10A and 10B are views showing an example of the operations in the dimension measuring apparatus 1 of FIG. 1. FIG. 10A shows a master image M1 used at the time of setting a measured position, and FIG. 10B shows a workpiece image W10 obtained by photographing at the time of actually measuring a dimension of the workpiece W.

In the case of appropriately arranging the workpiece W as the object to be measured within a photographed field of view on the movable stage 12, the workpiece W in the workpiece image W10 is in different location and posture as compared with the master image M1. Therefore, in the dimension measuring apparatus 1 according to the present embodiment, the checkup pattern image previously created from the master image M1 or the like is compared with the workpiece image W10, to specify the location and posture of the workpiece W inside the workpiece image W10.

As the checkup pattern image, there may be used either the master image M1 obtained by performing depth extension on a plurality of photographed images or a photographed image obtained by photographing the master workpiece in the state of the movable stage 12 being in a specific Z-directional position, and the master image M1 is used here.

Based on a detection result in such an arranged state, a position to be measured inside the workpiece image W10 is specified to perform edge extraction, thereby to allow accurate calculation of a dimension value of the position to be measured. The measurement result such as the dimension value can be displayed on the workpiece image W10. In this example, a dimension value and a dimension line are arranged on the workpiece image W10 in association with the position to be measured.

<Measurement Processing>

Figure 11:
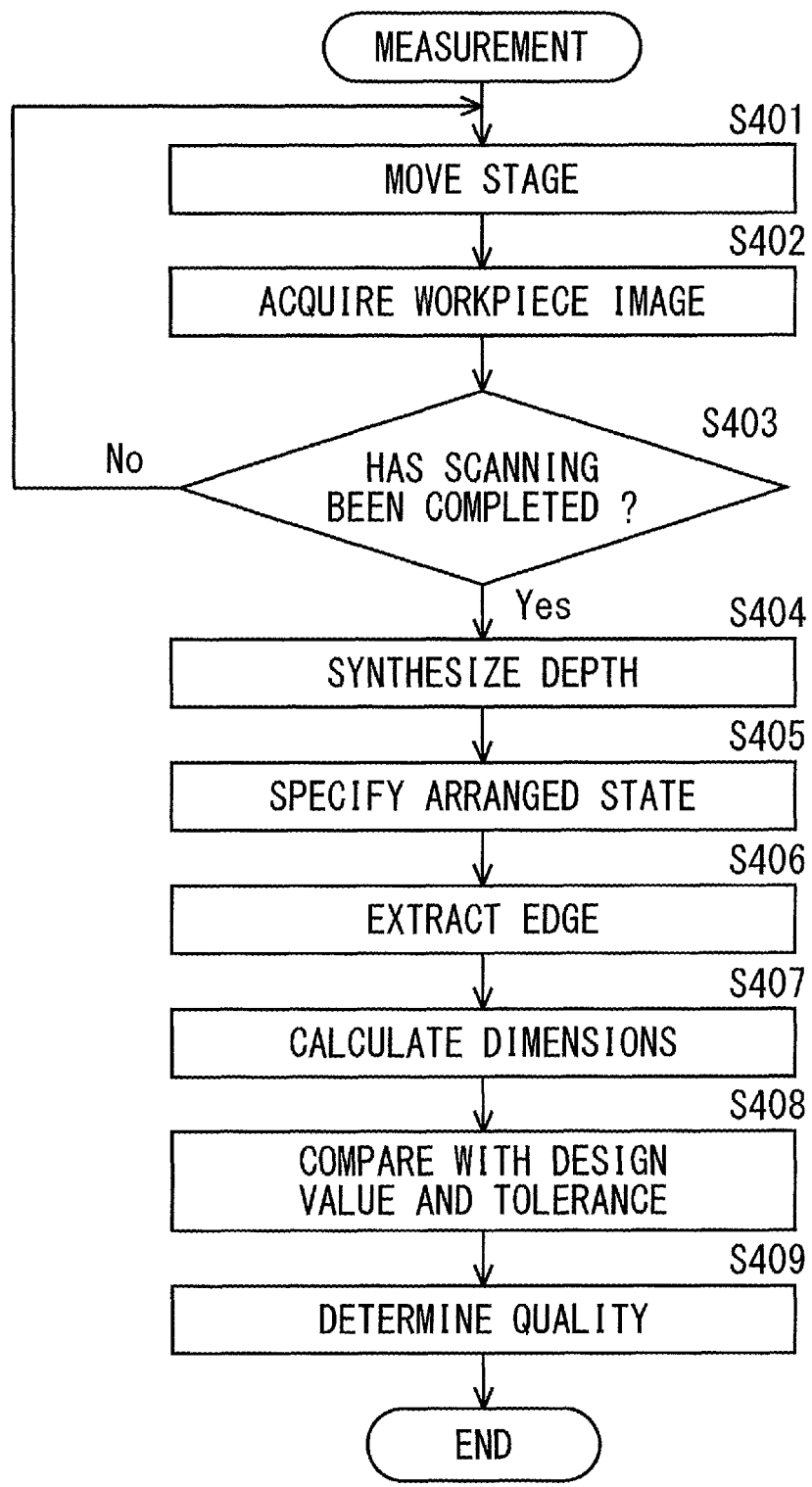
FIG. 11 is a flowchart showing another example of the operations in the dimension measuring apparatus 1 of FIG. 1 at the time of measuring a workpiece.

Steps S401 to S409 of FIG. 11 are a flowchart showing an example of the operations in the dimension measuring apparatus 1 of FIG. 1 at the time of measurement. When the workpiece W as the object to be measured is arranged on the movable stage 12 and measurement execution is designated by operation of the measurement start button 16 or the like, first, the workpiece W on the movable stage 12 is moved to a start position for depth extension, and the workpiece W on the movable stage 12 is photographed, to acquire a workpiece image (Steps S401 and S402).

Then, the movable stage 12 is moved in the Z direction only by a fixed distance, to re-acquire a workpiece image. This re-acquirement of the workpiece image is repeated until the movable stage 12 reaches an end position, and when Z-directional scanning is completed by the movable stage 12 reaching the end position, the obtained plurality of workpiece images are subjected to depth extension (Steps S403 and S404).

Next, the depth extended image obtained by depth extension is checked with a previously registered pattern image as feature amount information, to specify an arranged state of the workpiece W such as its location and posture (Step S405).

Specifically, a position to be measured is specified and an edge is extracted based on an arrange state of the workpiece W and previously registered measured position information (Step S406). Then a dimension value of the position to be measured is calculated based on the extracted edge of the position to be measured (Step S407).

Further, an error is obtained from a difference between the calculated dimension value and a previously registered design value as design value information, and the error is then compared with a tolerance with respect thereto, to perform quality determination on each position to be measured and quality determination on the workpiece W (Steps S408 and S409).

Figure 12:
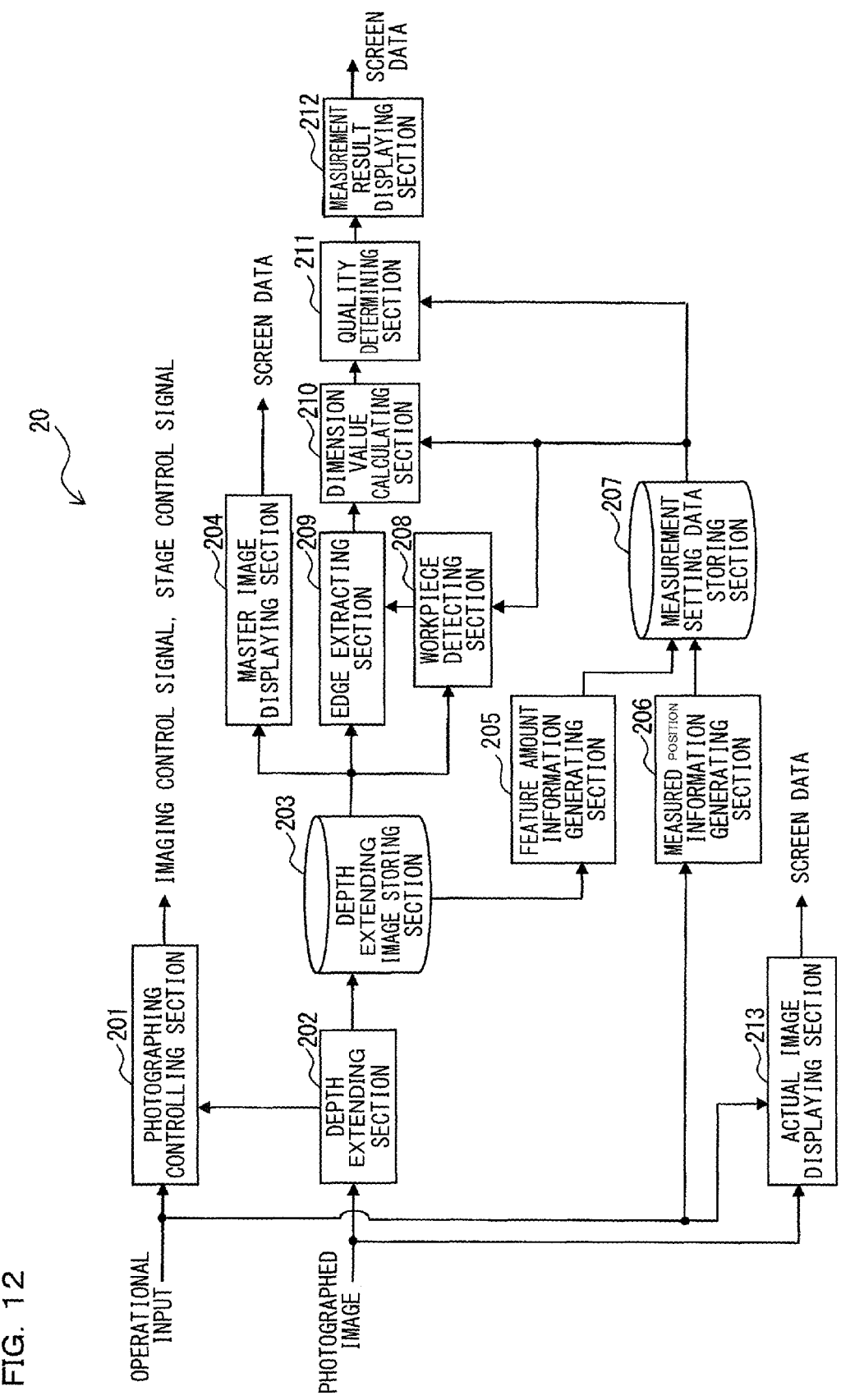
FIG. 12 is a block diagram showing a constitutional example of the control unit 20 of FIG. 1, showing an example of a functional configuration within the control unit 20.

FIG. 12 is a block diagram showing a constitutional example of the control unit 20 of FIG. 1, showing an example of a functional configuration within the control unit 20. This control unit 20 is made up of a photographing controlling section 201, a depth extending section 202, a depth extended image storing section 203, a master image displaying section 204, a feature amount information generating section 205, a measured position information generating section 206, a measurement setting data storing section 207, a workpiece detecting section 208, an edge detecting section 209, a dimension value calculating section 210, a quality determining section 211, a measurement result displaying section 212, and an actual image displaying section 213.

The photographing controlling section 201 is a control section for controlling photographing of the master workpiece and the workpiece W based on operational inputs from the measurement unit 10, the keyboard 31 and the mouse 32. The photographing controlling section 201 generates an imaging control signal and a stage control signal, and outputs the generated signals to the measurement unit 10. The imaging control signal is made up of control commands for controlling the imaging elements 155 and 158 inside the measurement unit 10, the measurement units 120 and 130, and the epi-illumination light source 141. The stage control signal is made up of a control command for controlling the stage driving unit 110.

The depth extending section 202 performs depth extension on a plurality of photographed images, which were acquired while Z-directional position of the movable stage 12 were made different, thereby to generate a depth extended image and stores the generated image into the depth extended image storing section 203.

At the time of setting the measured position, the master workpiece arranged on the movable stage 12 is photographed, to create a depth extended image (master image M1). The master image displaying section 204 creates screen data for displaying the master image M1 based on a depth extended image inside the depth extended image storing section 203, and outputs the generated data to the measurement unit 10. On the other hand, at the time of dimension measurement for the workpiece W, the workpiece W arranged on the movable stage 12 is photographed, to create a depth extended image.

The feature amount information generating section 205 generates feature amount information for detecting the workpiece W based on the depth extended image inside the depth extended image storing section 203, and stores the generated information as measurement setting data into the measurement setting data storing section 207. This feature amount information is formed of a checkup pattern image, and generated based on the master image M1.

The measured position information generating section 206 generates measured position information formed of a position to be measured and a measuring method based on an operational input, and stores the generated data as measurement setting data inside the measurement setting data storing section 207. This measured position information is generated by designating a position to be measured, a type of measurement and an illumination method with respect to the master image M1.

The measurement setting data storing section 207 holds the feature amount information, the measured position information and the design value information as the measurement setting data. The feature amount information is feature information for checking which is used for detecting an arranged state, such as a location and posture, of the workpiece W within the workpiece image, and made up of a pattern image for pattern matching, geometrical shape information for geometrical shape correlated search, feature point information showing a feature point of the workpiece W. The design value information is formed of a design value set with respect to each position to be measured, and a tolerance associated with the design value.

The workpiece detecting section 208 specifies the location and posture of the workpiece W in the workpiece image based on the feature amount information. Specifically, the depth extended image of the workpiece W is compared with the checkup pattern image, to determine the location and posture of the workpiece W, and a result of the determination is outputted to the edge detecting section 209.

The edge extracting section 209 specifies the position to be measured in the depth extended image of the workpiece W whose arranged state has been specified by the workpiece detecting section 208 from the arrange state and the measured position information thereof, and extracts an edge of the position to be measured from the workpiece image. Edge extraction is performed by analyzing a change in brightness value between adjacent pixels in image data inside an edge detection area A1 designated in the measured position information.

The dimension value calculating section 210 calculates a dimension value of the position to be measured based on the edge extracted by the edge extracting section 209, and outputs the calculated value to the quality determining section 211. Specifically, a plurality of edge points obtained by edge extraction are fitted with a geometrical shape such as a straight line or an arc by means of a statistical technique such as the method of least squares, thereby to specify an edge of the workpiece W. When two parallel linear sections on the edge of the workpiece W are, for example, designated as the positions to be measured, a distance between these straight lines is calculated as a dimension value. Further, when a linear section and a feature point are designated, a distance between the straight line and the feature point is calculated as the dimension value. Moreover, when two linear sections with different inclinations are designated, an angle between these straight lines is calculated as the dimension value. Furthermore, when a part of a circle (arc) or the whole of the circle is designated as the positions to be measured, a diameter, a radius or a central coordinate of the circle is calculated as the dimension value.

The quality determining section 211 obtains an error from a difference made between the dimension value calculated by the dimension value calculating section 210 and a design value corresponding thereto, and compares the error with a corresponding tolerance, to perform quality determination on the dimension value with respect to each position to be measured, and quality determination on the workpiece W. The quality determination on the dimension value is performed by determining whether or not the difference (error) between the dimension value and the design value is within a tolerance range. Further, the quality determination on the workpiece W is performed based on the result of the quality determination on the dimension value with respect to each position to be measured.

The measurement result displaying section 212 creates screen data for displaying the dimension value and a result of the quality determination on the depth extended image of the workpiece W, and outputs the generated data to the measurement unit 10. The actual image displaying section 213 generates screen data for displaying the actual image obtained by photographing the master workpiece based on the operational input, and outputs the generated data to the measurement unit 10.

<Detail Setting Screen 3>

Figure 7:
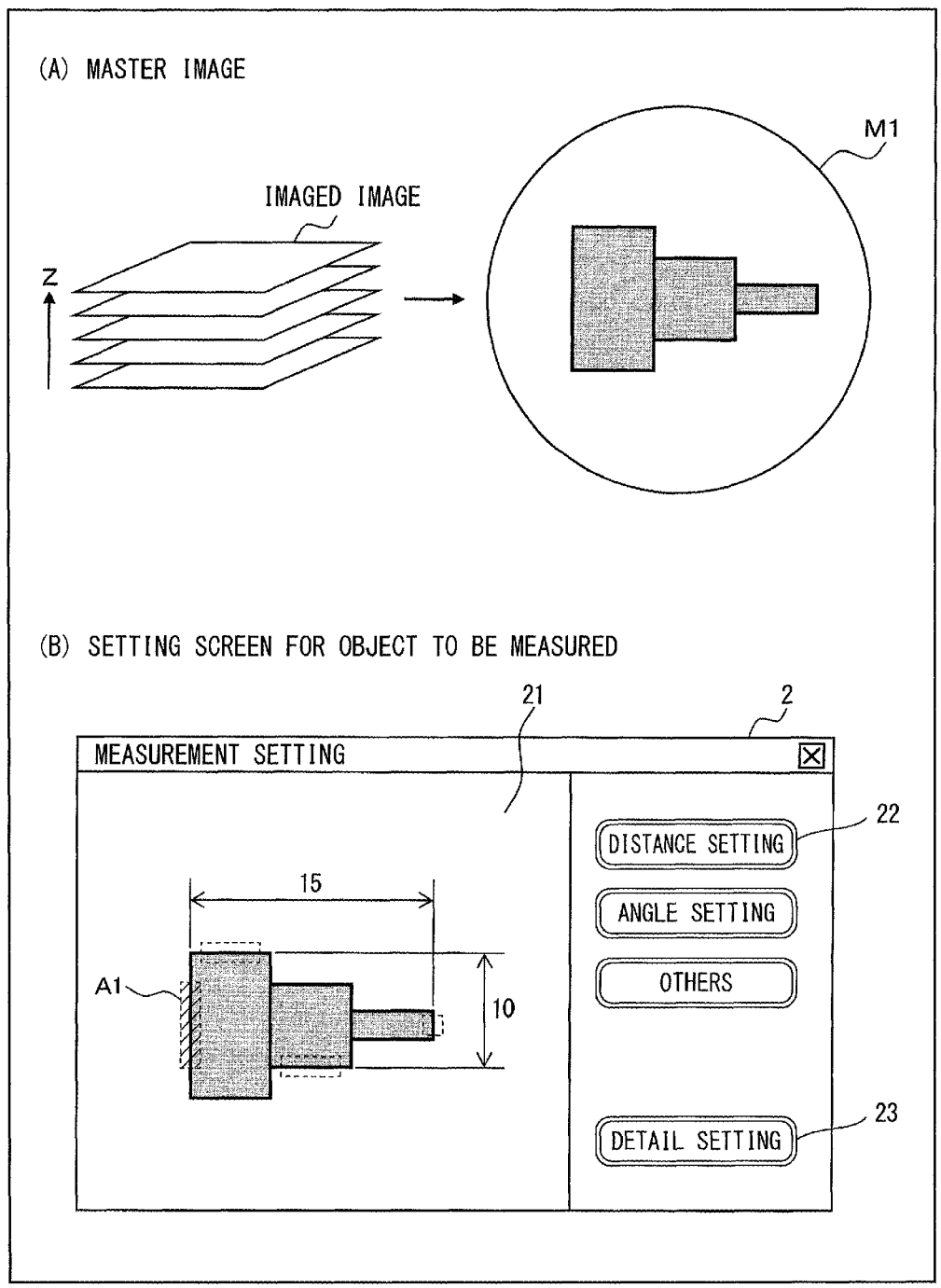
FIGS. 7A and 7B are views showing an example of the operations in the dimension measuring apparatus 1 of FIG. 1 at the time of setting a measured position, showing a master image M1 and a measurement setting screen 2.
Figure 13:
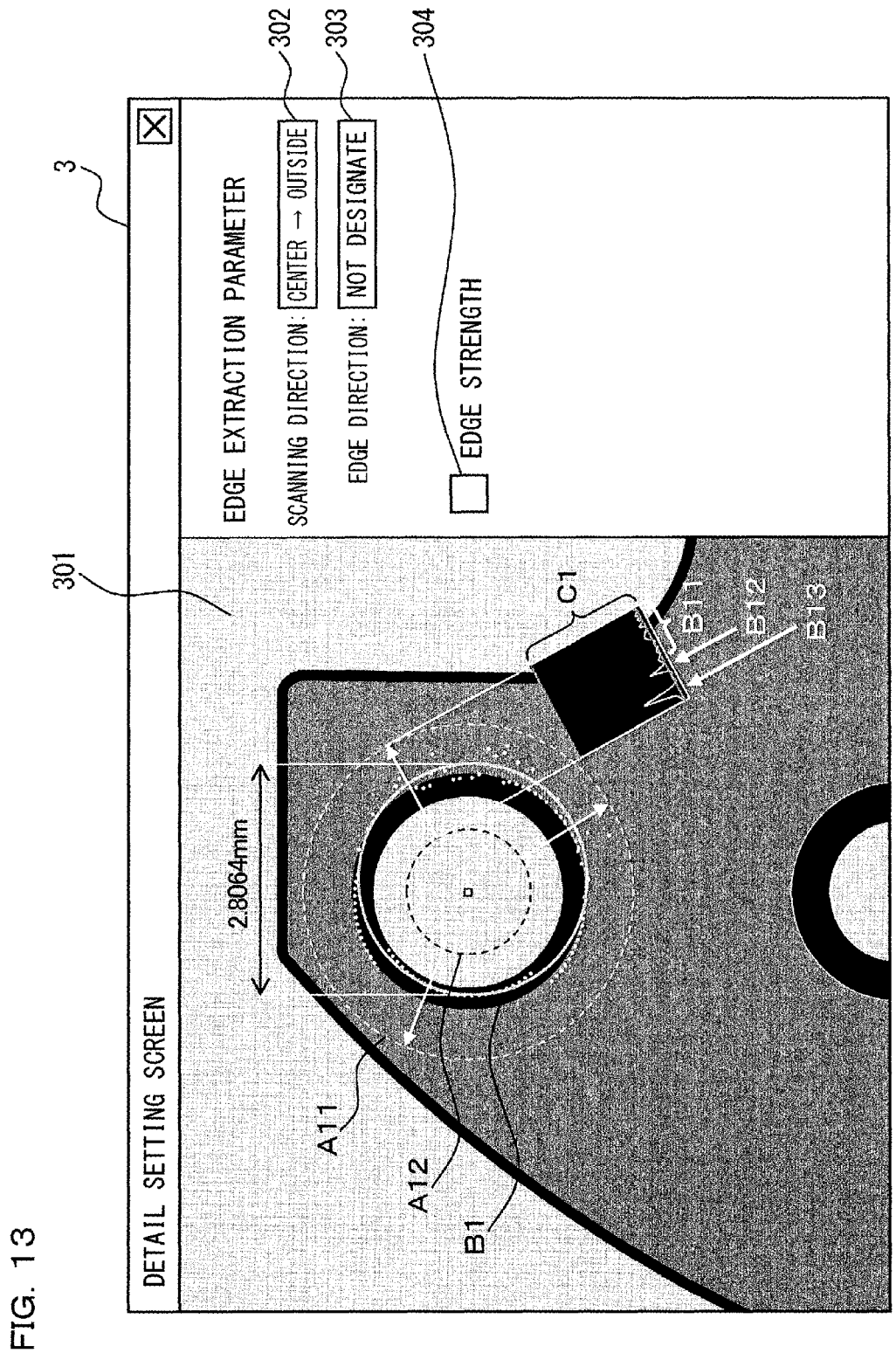
FIG. 13 is a view showing an example of a detail setting screen 3 displayed by operation of a setting button 23 inside the measurement setting screen 2 of FIG. 7.

FIG. 13 is a view showing an example of a detail setting screen 3 displayed on the display 11 by operation of the setting button 23 inside the measurement setting screen 2 of FIG. 7. This figure shows the case of setting the conditions for edge extraction by use of a high-magnification actual image obtained by photographing with a high magnification the master workpiece within a high-magnification field of view.

The measurement setting screen 3 is an input screen for setting in detail conditions for edge extraction at the time of extracting an edge from the depth extended image. For example, a position to be measured is designated with respect to the master image M1 to switch the screen to the actual image, and the setting button 23 is then operated to display the measurement setting screen 3.

In this measurement setting screen 3, a display area 301 for displaying the master image M1 and the actual image of the master workpiece, input fields 302, 303 for specifying edge extraction parameters, and an input field 304 for designating a threshold for edge extraction are arranged. The input field 302 is an input area for designating a scanning direction as the edge extraction parameter. The scanning direction is a direction of a row of pixels at the time of analyzing a change in brightness between adjacent pixels with respect to image data inside the edge detection area A. Specifically, in the case of extracting a circle as the edge, either a direction from the center outward or a direction from the outside toward the center can be selected as the scanning direction. In this example, the direction from the center outward is designated as the scanning direction.

The input field 303 is an input area for designating an edge direction as the edge extraction parameter. The edge direction is a positive or a negative of the strength of the edge as the object to be extracted at the time of extracting the edge with the scanning direction, designated in the input field 302, as a normal direction. Specifically, any of a positive polarity where the brightness changes from darkness to brightness, a negative polarity where the brightness changes from brightness to darkness, and a non-designated polarity can be selected as the edge direction.

The input field 304 is an input area for designating an upper limit and a lower limit of the edge strength as thresholds for narrowing down edge points of the objects to be extracted. A distribution of the edge strength concerning the scanning direction is obtained based on the image data inside the edge detection area A1, and the edge point is then extracted based on this edge strength distribution.

In this example, an actual image of the master workpiece formed having a step on the periphery of a circular through hole is displayed inside the display area 301. The edge detection area A1 having concentric circles A11 and A12 respectively as its outer edge and an inner edge is designated with respect to the actual image, to detect an edge point inside the edge detection area A1, and a circle B1 that fits a large number of detected edge points is outputted as the edge of the object to be measured.

In the case of this actual image, an outer edge of the object to be measured is not accurately detected under influence of an inner edge of the through hole with large strength, leading to a large error included in the dimension value. A diameter of the circle B1 is 2.8064 mm.

It is to be noted that in this example, a distribution chart C1 for the edge strength is displayed on the actual image. The distribution chart C1 is created by analyzing the image data inside the edge detection area A1 in the scanning direction, and displayed based on a predetermined operation designating a position inside the edge detection area A1. In this distribution chart C1, other than a peak point B12 of the edge strength corresponding to the edge as the object to be measured, a noise component B11 is detected on the outside thereof, and a peak B13 corresponding to an edge inside the through hole is detected on the inside thereof.

Figure 14:
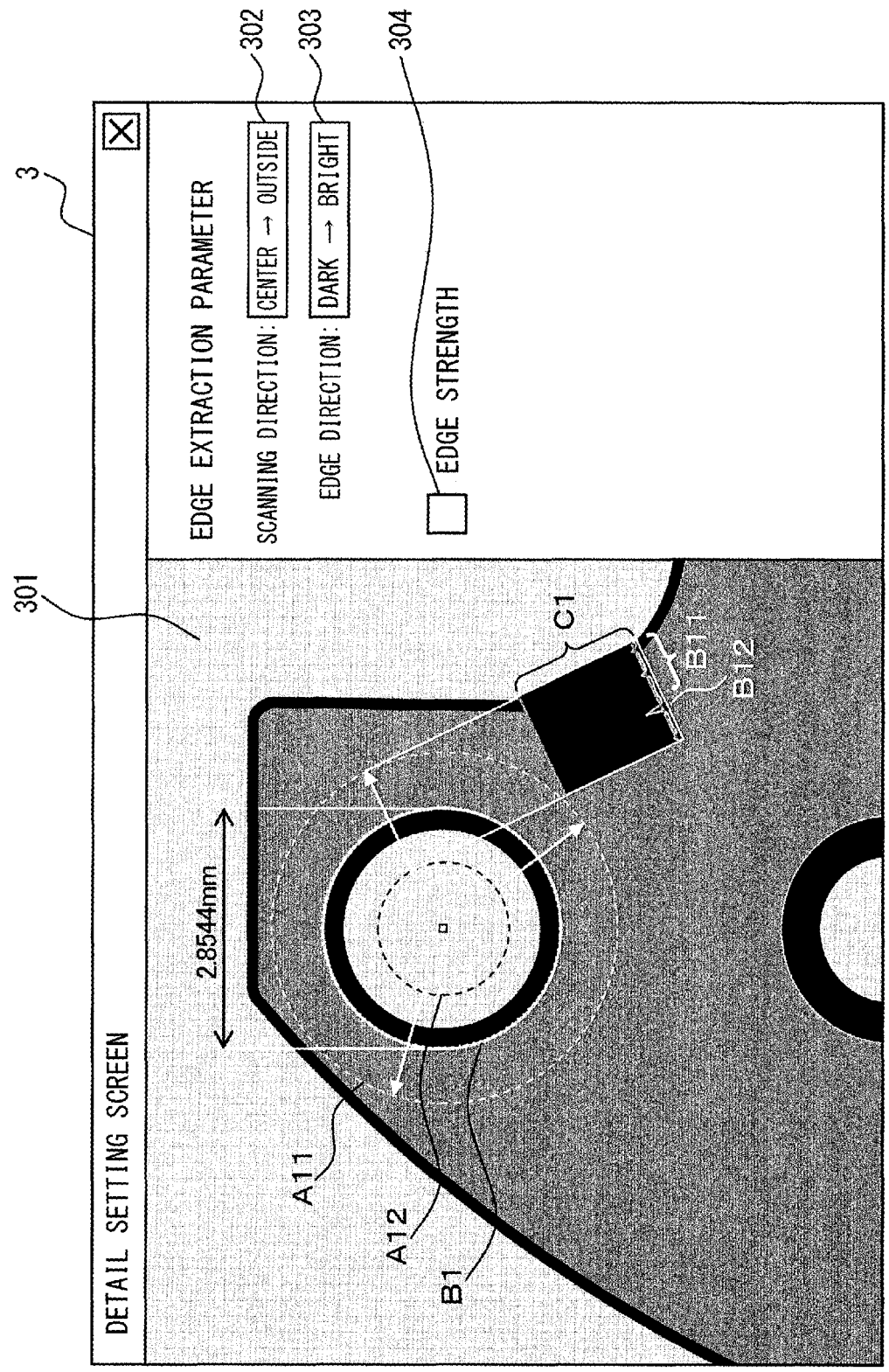
FIG. 14 is a view showing an example of the detail setting screen 3 displayed by operation of the setting button 23 inside the measurement setting screen 2 of FIG. 7, showing the case of designating an edge direction.

FIG. 14 is a view showing an example of the detail setting screen 3 displayed by operation of the setting button 23 inside the measurement setting screen 2 of FIG. 7, showing the case of designating an edge direction as the condition for edge extraction. In this measurement setting screen 3, the direction in which the brightness changes from darkness to brightness is designated as the edge direction.

For this reason, the edge point at which brightness changes from brightness to darkness concerning the scanning direction is not extracted, and it is thus possible to suppress the influence of the edge inside the through hole. In this case, a measured value of a diameter of the circle B1 is 2.8544 mm, and an error of the dimension value is small.

Figure 15:
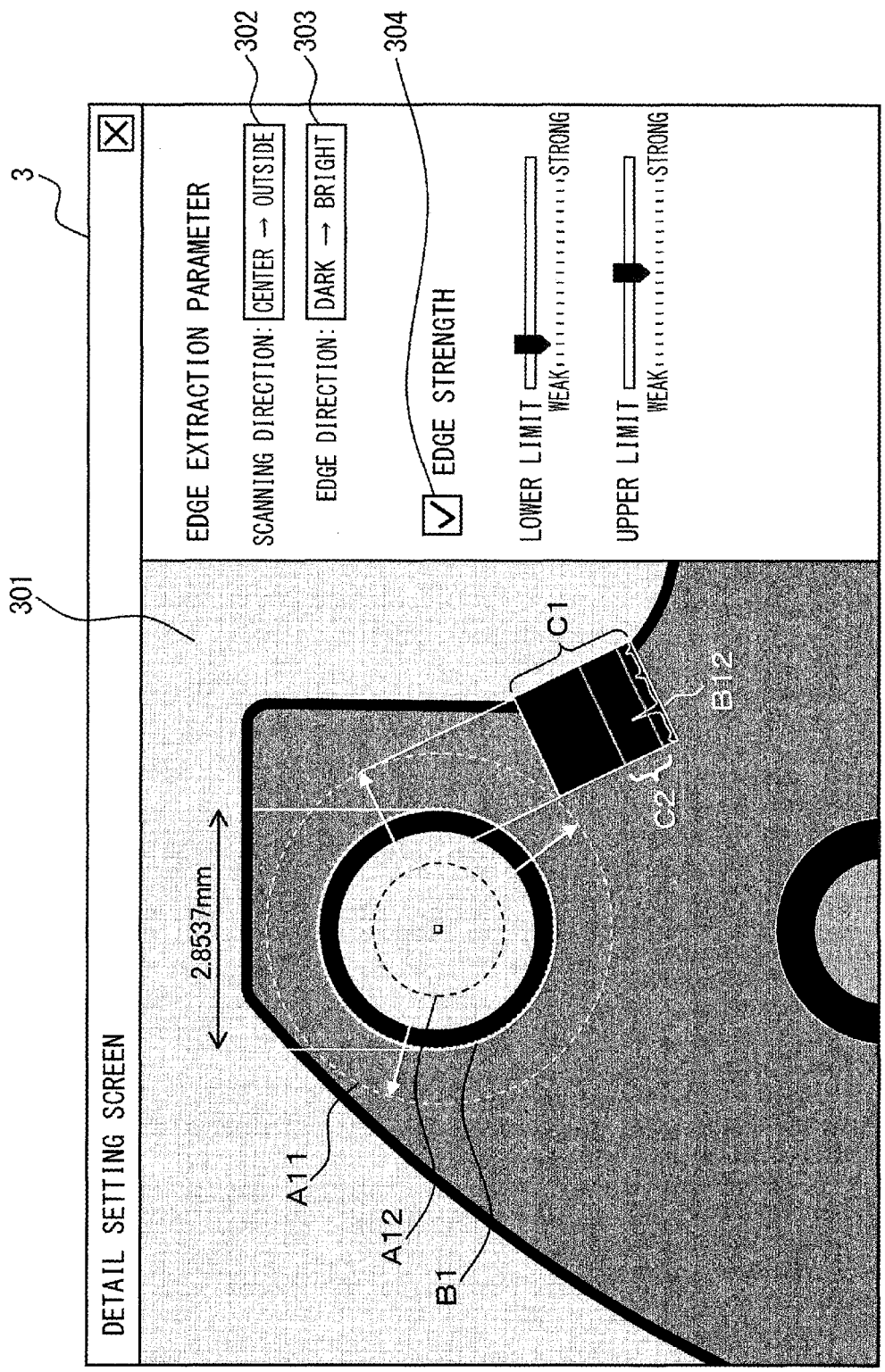
FIG. 15 is a view showing an example of the detail setting screen 3 displayed by operation of the setting button 23 inside the measurement setting screen 2 of FIG. 7, showing the case of designating a threshold of edge strength.

FIG. 15 is a view showing an example of the detail setting screen 3 displayed by operation of the setting button 23 inside the measurement setting screen 2 of FIG. 7, showing the case of designating a threshold of edge strength as the condition for edge extraction. In this detail setting screen 3, an upper limit and a lower limit of the edge strength are designated as thresholds for narrowing down edge points as the objects to be extracted.

Based on the edge strength distribution concerning the scanning direction, at the time of extracting edge points, those are narrowed down to edge points within a range C2 of the edge strength being not larger than the upper limit and not smaller than the lower limit, to perform edge extraction.

For this reason, an edge point with the edge strength being out of the range C2 and noise are not extracted, thereby to allow suppression of the influence of the edge inside the through hole. In this case, a measured value of a diameter of the circle B1 is 2.8537 mm, and an error of the dimension value is small.

According to the present embodiment, a depth extended image obtained by photographing a master workpiece is used as the master image M1 for designating a position to be measured and a measuring method, and it is thereby possible to grasp a whole image of the workpiece W with ease so long as the workpiece W has the same shape as the master workpiece even when the workpiece W has a step exceeding the depth of field of the imaging section. This can facilitate setting of a plurality of positions with different Z-directional heights in the workpiece W as the object to be measure. Further, since an edge is extracted from the depth extended image obtained by photographing the workpiece W with respect to the position to be measured as thus set to calculate a dimension value, it is possible to obtain a desired dimension without manual adjustment of a Z-directional position of the movable stage 12 at the time of dimension measurement for the workpiece W.

Moreover, when a position to be measured is designated for the master image M1, the movable stage 12 is moved to a corresponding Z-directional position, for focus adjustment so that a photographed image of the master workpiece is obtained. Since a position to be measured and a measuring method are designated with respect to this actual image, conditions for edge extraction or the like can be set in detail by means of the actual image without awareness of a height of the position to be measured.

Moreover, the workpiece image obtained by photographing the workpiece W on the movable stage 12 is checked with the pattern image, to allow accurate specification of the location and posture of the workpiece W having the same shape as the master workpiece. Furthermore, since edge extraction is performed on the position to be measured based on the specified location and posture, even when the workpiece W is arranged in an arbitrary posture and an arbitrary position on the movable stage 12, a desired dimension can be measured with high accuracy so long as the workpiece W is arranged within the photographed field of view.

In addition, the example of the case has been described in the present embodiment where the checkup pattern image is created from the master image M1 obtained by performing depth extension on the plurality of photographed images, and the depth extended image of the workpiece W is compared with the pattern image to specify the location and posture of the workpiece W in the depth extended image, but the present invention does not restrict the workpiece detecting method to this. For example, the checkup pattern image is created from the photographed image obtained by photographing the master workpiece in a state where the movable stage 12 is located in a specific Z-directional position. At the time of positioning the workpiece W for dimension measurement, it may be configured such that the workpiece W is photographed while the movable stage 12 is moved to the specific position, and the obtained workpiece image is compared with the pattern image, to determine the location and posture of the workpiece within the photographed field of view.

Embodiment 2

In Embodiment 1, the example of the case was described where the edge as the position to be measured is extracted from the depth extended image obtained by photographing the workpiece W to calculate a dimension value. As opposed to this, in the present embodiment, there will be described a case where the movable stage 12 is moved to a Z-directional position corresponding to the position to be measured, for focus adjustment to the position to be measured, and an edge of the position to be measured is extracted from the workpiece image subjected to focus adjustment, to calculate a dimension value.

Figure 16:
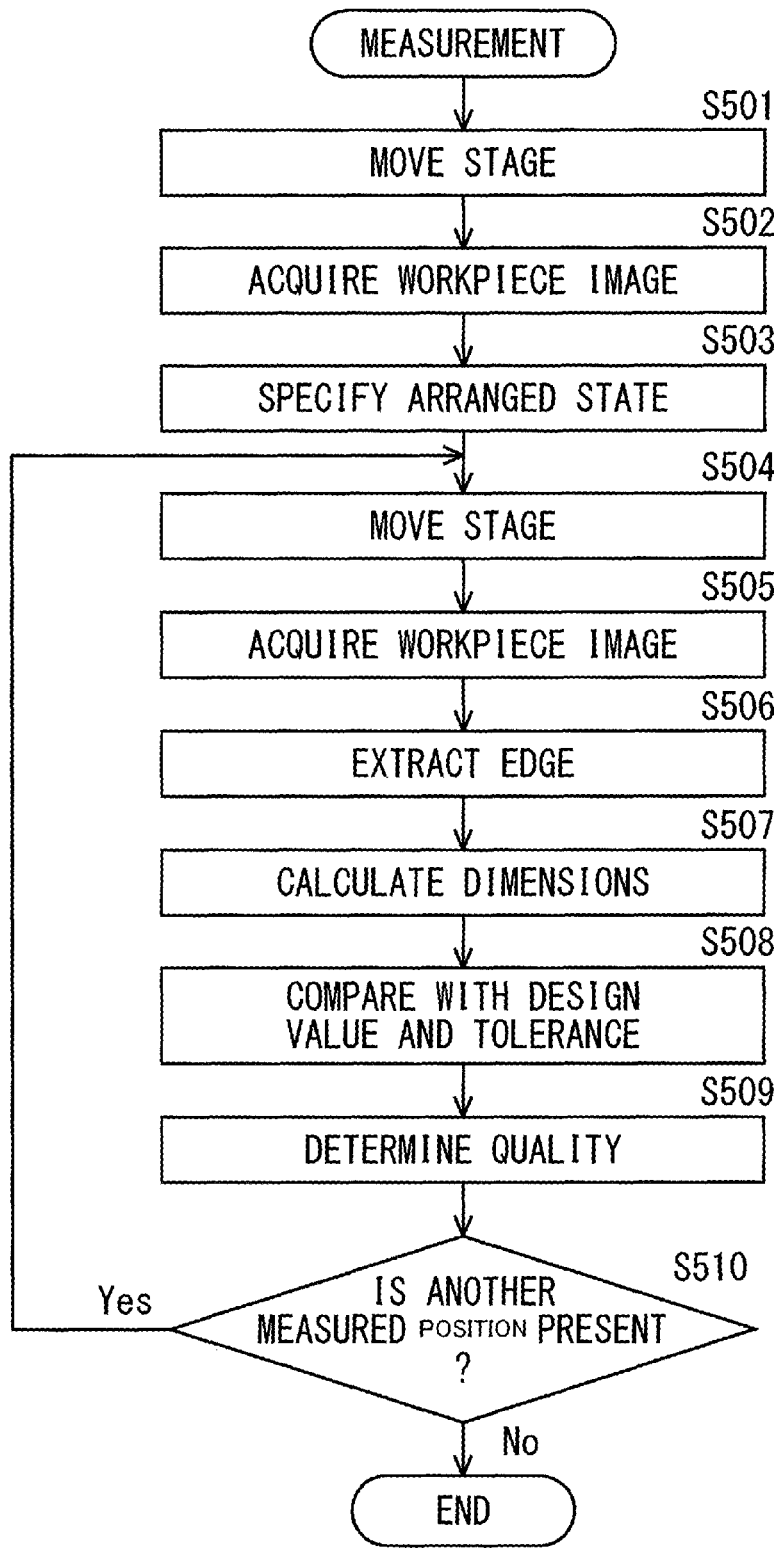
FIG. 16 is a flowchart showing an example of operations in the dimension measuring apparatus 1 at the time of measuring a workpiece according to Embodiment 2 of the present invention.

Steps S501 to S510 of FIG. 16 are a flowchart showing an example of the operations in the dimension measuring apparatus 1 according to Embodiment 2 of the present invention at the time of measuring a workpiece. When the workpiece W as the object to be measured is arranged on the movable stage 12 and measurement execution is designated by operation of the measurement start button 16 or the like, first, the workpiece W on the movable stage 12 is moved to a Z-directional position where the checkup pattern image has been photographed, and the workpiece W on the movable stage 12 is photographed, to acquire a workpiece image (Steps S501 and S502).

Next, the obtained workpiece image is checked with a previously registered pattern image as feature amount information, to specify an arranged state of the workpiece W such as its location and posture within the photographed field of view (Step S503).

Next, the movable stage 12 is moved to a Z-directional position corresponding to the position to be measured and the workpiece W on the movable stage 12 is photographed, to newly acquire a workpiece image (Steps S504 and S505). Then, a position to be measured is specified and an edge is extracted based on an arranged state of the workpiece W and previously registered measured position information, to extract an edge (Step S506). Then a dimension value of the position to be measured is calculated based on the extracted edge of the position to be measured (Step S507).

Further, an error is obtained from a difference between the calculated dimension value and a previously registered design value as design value information, and the error is then compared with a corresponding tolerance, to perform quality determination on each position to be measured and quality determination on the workpiece W (Steps S508 and S509).

The processing procedures from Steps S504 to S509 are repeated when another position to be measured has been set until a dimension value is obtained with respect to every position to be measured (Step S510).

Figure 17:
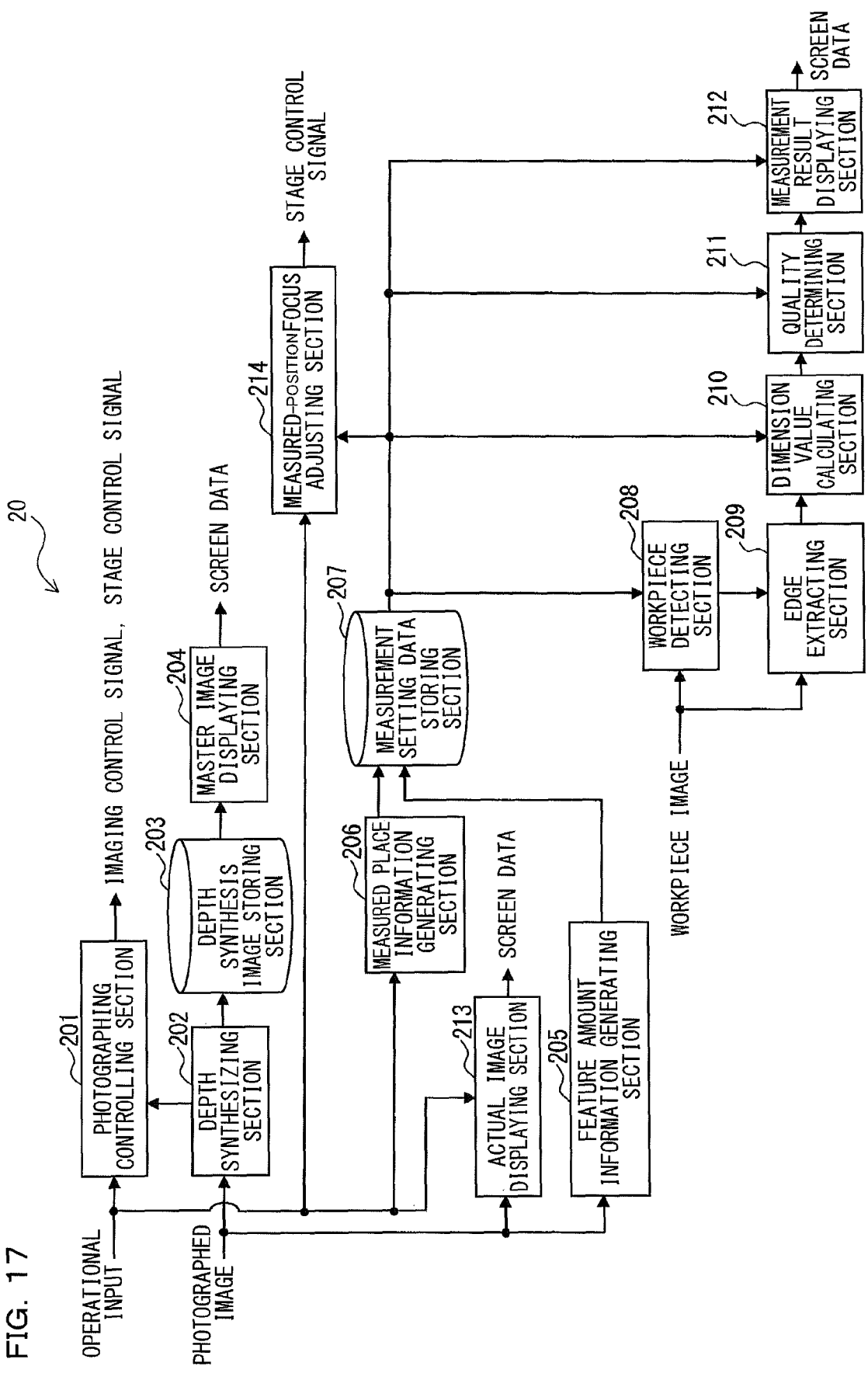
FIG. 17 is a block diagram showing a constitutional example of the control unit 20 in the dimension measuring apparatus 1 of FIG. 16.

FIG. 17 is a block diagram showing a constitutional example of the control unit 20 in the dimension measuring apparatus 1 of FIG. 16. This control unit 20 is different from the control unit 20 of FIG. 12 in provision of a measured-position focus adjusting section 214.

In this control unit 20, a checkup pattern image is created from a photographed image obtained by photographing the master workpiece. That is, the feature amount information generating section 205 makes the master workpiece photographed in a state where the movable stage 12 is located in a specific Z-directional position, and generates feature amount information formed of the checkup pattern image based on the obtained photographed image. The position of the movable stage 12 at the time of setting the feature amount information can be directly designated, or be designated by selecting a position to be measured inside the master image M1. Alternatively, any of photographed images for depth extension which are acquired for creating the master image M1 may be used for setting the feature amount information.

The measured-position focus adjusting section 214 moves the movable stage 12 to a Z-directional position corresponding to the checkup pattern image based on an operational input in order to specify the arranged state of the workpiece W within the photographed field of view. The workpiece detecting section 208 compares the workpiece image acquired at this time with the pattern image, to determine a location and posture of the workpiece W within the photographed field of view.

Moreover, in the control unit 20, the movable stage 12 is moved to a Z-directional position corresponding to the position to be measured, and an edge of the position to be measured is extracted from the photographed workpiece image, to calculate a dimension value. That is, the measured-position focus adjusting section 214 moves the movable stage 12 to a Z-directional position corresponding to the position to be measured, for focus adjustment to the position to be measured.

The edge detecting section 209 extracts an edge of the position to be measured from the workpiece image subjected to focus adjustment based on measured position information. In the case of the presence of a plurality of positions to be measured with different heights with respect to the same workpiece W, the focus-on-measured-position adjusting section 214 sequentially moves the movable stage 12 to Z-directional positions corresponding to these positions to be measured.

According to the present embodiment, the movable stage 12 is moved to a Z-directional position corresponding to the position to be measured, having been set using the master image M1, for focus adjustment so as to acquire a workpiece image. Since an edge is extracted from this workpiece image to calculate a dimension value of the position to be measured, it is possible to obtain a desired dimension even without manual adjustment of the Z-directional position of the movable stage 12 at the time of dimension measurement for the workpiece W.

Further, since the movable stage 12 is sequentially moved for focus adjustment, even in the case of the presence of a plurality of positions to be measured with different heights with respect to the same workpiece, it is possible to automatically transfer these positions to be measured sequentially to focal positions, so as to obtain the dimension values of the positions to be measured.

In addition, although the example of the case has been described in Embodiments 1 and 2 where the low-magnification photographing and the high-magnification photographing are electrically switched, the present invention does not restrict the method for switching the photographing magnification to this. For example, the present invention includes one which mechanically switches the light-receiving lens (objective lens) on the movable stage 12 side, so called a revolver type. That is, an objective lens unit made up of a light-receiving lens for low-magnification photographing and a light-receiving lens for high-magnification photographing is rotated with respect to a set of image forming unit made up of a diaphragm plate, an image forming lens and an imaging element, to switch between the low-magnification photographing and the high-magnification photographing.

What is claimed is:

1. A dimension measuring apparatus which measures a dimension of a workpiece on a movable stage being movable in a Z direction based on an edge of a workpiece image obtained by photographing the workpiece, the apparatus comprising:

an imaging section that photographs a master workpiece on the movable stage, to generate a photographed image;

a depth extending section that generates a depth extended image which is a multifocal image obtained by synthesizing a plurality of photographed images having different Z positions in focus, wherein each photographed image for use in depth extension is associated with position information showing the Z-directional position of the movable stage, and each pixel of the depth extended image is associated with the position information of the corresponding photographed image;

a master image displaying section that screen-displays the depth extended image as a master image;

a measured position information generating section that designates a position to be measured and a measuring method with respect to the master image, to generate measured position information, wherein the measured position information is associated with Z-directional position information of the movable stage;

a measurement setting data storing section that stores the measured position information with the Z-direction position information, the design value information showing a design value and a tolerance with respect to each position to be measured;

a focus-on-measured-position adjusting section that moves the movable stage automatically to a Z-directional position corresponding to the position to be measured, for focus adjustment to the position to be measured;

a workpiece image capturing section that captures the workpiece image at the adjusted Z-directional position corresponding to the position to be measured;

an edge extracting section that extracts an edge of the position to be measured from the workpiece image, subjected to focus adjustment, based on the measured position information;

a dimension value calculating section that obtains a dimension value of the position to be measured based on the extracted edge; and a quality determining section that obtains an error from a difference made between the dimension value calculated by the dimension value calculating section and the design value corresponding thereto, and compares the error with the corresponding tolerance, to perform quality determination on the dimension value with respect to each position to be measured, and quality determination on the workpiece.

2. The dimension measuring apparatus according to claim 1, wherein in the case of the presence of two or more positions to be measured with different heights with respect to the same workpiece, the focus-on-measured-position adjusting section sequentially moves the movable stage to Z-directional positions corresponding to the positions to be measured.

3. The dimension measuring apparatus according to claim 1, further comprising:

an epi-illumination light source that applies illumination light from the same side as the imaging section to the workpiece on the movable stage; and a photographed image displaying section that moves the movable stage to a Z-directional position corresponding to the position to be measured at the time of designation of the position to be measured with respect to the master image, for focus adjustment so as to obtain and screen-display a photographed image of the master workpiece after the focus adjustment, wherein the measured position information generating section designates a position to be measured and a measuring method with respect to the photographed image of the master workpiece after the focus adjustment, to generate the measured position information.

4. The dimension measuring apparatus according to claim 1, further comprising:

a feature amount information generating section that generates feature amount information formed of a checkup pattern image based on the photographed image of the master workpiece; and a workpiece detecting section that specifies a location and posture of the workpiece on the movable stage based on the feature amount information, wherein the edge extracting section performs edge extraction on the position to be measured based on the specified location and posture and the measured position information.

5. The dimension measuring apparatus according to claim 4, wherein the feature amount information generating section generates the feature amount information based on the depth extended image obtained by photographing the master workpiece, and the workpiece detecting section checks the depth extended image, obtained by photographing the workpiece, with the pattern image to specify the location and posture of the workpiece.

6. A dimension measuring method for measuring a dimension of a workpiece on a movable stage being movable in a Z direction based on an edge of a workpiece image obtained by photographing the workpiece, the method comprising:

an imaging step for photographing a master workpiece on the movable stage, to generate a photographed image;

a depth extending step for generating a depth extended image which is a multifocal image obtained by synthesizing a plurality of photographed images having different Z positions in focus, wherein each photographed image for use in depth extension is associated with position information showing the Z-directional position of the movable stage, and each pixel of the depth extended image is associated with the position information of the corresponding photographed image;

a master image displaying step for screen-displaying the depth extended image as a master image;

a measured position information generating step for designating a position to be measured and a measuring method with respect to the master image, to generate measured position information, wherein the measured position information is associated with Z-directional position information of the movable stage;

a measurement setting data storing step for storing the measured position information with the Z-direction position information, the design value information showing a design value and a tolerance with respect to each position to be measured;

a focus-on-measured-position adjusting step for moving the movable stage automatically to a Z-directional position corresponding to the position to be measured, for focus adjustment to the position to be measured;

a workpiece image capturing step that captures the workpiece image at the adjusted Z-directional position corresponding to the position to be measured;

an edge extracting step for extracting an edge of the position to be measured from the workpiece image, subjected to focus adjustment, based on the measured position information;

a dimension value calculating step for obtaining a dimension value of the position to be measured based on the extracted edge; and a quality determining step for obtaining an error from a difference made between the dimension value calculated by the dimension value calculating step and the design value corresponding thereto, and compares the error with the corresponding tolerance, to perform quality determination on the dimension value with respect to each position to be measured, and quality determination on the workpiece.

7. A program, stored on a non-transitory computer readable medium, for a dimension measuring apparatus for measuring a dimension of a workpiece on a movable stage being movable in a Z direction based on an edge of a workpiece image obtained by photographing the workpiece, the program, when executed by a computer, performing:

an imaging procedure for photographing a master workpiece on the movable stage, to generate a photographed image;

a depth extending procedure for generating a depth extended image which is a multifocal image obtained by synthesizing a plurality of photographed images having different Z positions in focus, wherein each photographed image for use in depth extension is associated with position information showing the Z-directional position of the movable stage and each pixel of the depth extended image is associated with the position information of the corresponding photographed image;

a master image displaying procedure for screen-displaying the depth extended image as a master image;

a measured position information generating procedure for designating a position to be measured and a measuring method with respect to the master image, to generate measured position information, wherein the measured position information is associated with Z-directional position information of the movable stage;

a measurement setting data storing procedure for storing the measured position information with the Z-direction position information, the design value information showing a design value and a tolerance with respect to each position to be measured;

a focus-on-measured-position adjusting procedure for moving the movable stage automatically to a Z-directional position corresponding to the position to be measured, for focus adjustment to the position to be measured;

a workpiece image capturing procedure that captures the workpiece image at the adjusted Z-directional position corresponding to the position to be measured;

an edge extracting procedure for extracting an edge of the position to be measured from the workpiece image, subjected to focus adjustment, based on the measured position information;

a dimension value calculating procedure for obtaining a dimension value of the position to be measured based on the extracted edge; and a quality determining procedure for obtaining an error from a difference made between the dimension value calculated by the dimension value calculating procedure and the design value corresponding thereto, and compares the error with the corresponding tolerance, to perform quality determination on the dimension value with respect to each position to be measured, and quality determination on the workpiece.

* * * * *